United States Patent
Miller et al.

(10) Patent No.: US 9,731,385 B2
(45) Date of Patent: Aug. 15, 2017

(54) ORBITAL WELDER WITH WIRE HEIGHT ADJUSTMENT ASSEMBLY

(71) Applicant: LINCOLN GLOBAL, INC., City of Industry, CA (US)

(72) Inventors: Victor Miller, Jamul, CA (US); Jamil Snead, San Diego, CA (US)

(73) Assignee: Lincoln Global, Inc., Santa Fe Springs, CA (US)

( * ) Notice: Subject to any disclaimer, the term of this patent is extended or adjusted under 35 U.S.C. 154(b) by 618 days.

(21) Appl. No.: 14/174,292

(22) Filed: Feb. 6, 2014

(65) Prior Publication Data
US 2015/0129580 A1    May 14, 2015

Related U.S. Application Data

(60) Provisional application No. 61/903,312, filed on Nov. 12, 2013.

(51) Int. Cl.
*B23K 37/02* (2006.01)
*B23K 9/028* (2006.01)
(Continued)

(52) U.S. Cl.
CPC ........ *B23K 37/0211* (2013.01); *B23K 9/0286* (2013.01); *B23K 9/167* (2013.01);
(Continued)

(58) Field of Classification Search
CPC B23K 37/0211; B23K 37/0276; B23K 9/167; B23K 37/0229; B23K 9/0286; B23K 2201/06
(Continued)

(56) References Cited

U.S. PATENT DOCUMENTS 1,704,846 A    3/1929  Stresau
2,138,837 A   12/1938  Cadman
(Continued)

FOREIGN PATENT DOCUMENTS

DE         965794 C    6/1952
DE         3238496    10/1982
(Continued)

OTHER PUBLICATIONS

Polysoude The Art of Welding, Tig—With or without Filler Wire, AVC, OSC, Open Welding Head for Welding of Tube to Tube Joints, Tube to Elbow Joints . . . , Polysoude S.A.S. France (Mar. 2011).
(Continued)

*Primary Examiner* — David Angwin
*Assistant Examiner* — Biniam Asmelash
(74) *Attorney, Agent, or Firm* — Foley & Lardner LLP

(57) ABSTRACT

A welding system for applying a weld to a workpiece, the welding system including a frame, a welding torch mounted on the frame, the welding torch including an electrode; a wire guide adapted to direct a wire toward the electrode; a wire alignment assembly including a fixture frame having a wire guide holder mounted thereon, the wire guide being supported on the wire guide holder, wherein the wire alignment assembly includes multiple degrees of freedom for adjusting the position of the wire guide as needed for a given welding operation.

20 Claims, 31 Drawing Sheets

(51) Int. Cl.
*B23K 9/167* (2006.01)
*B23K 101/06* (2006.01)

(52) U.S. Cl.
CPC ...... *B23K 37/0229* (2013.01); *B23K 37/0276* (2013.01); *B23K 2201/06* (2013.01)

(58) Field of Classification Search
USPC .......... 219/60 A, 61.3, 61.4, 121.45, 121.46, 219/76.16
See application file for complete search history.

(56) References Cited

U.S. PATENT DOCUMENTS

| | | | |
|---|---|---|---|
| 2,445,039 A | 7/1948 | Rusnok | |
| 2,515,302 A | 7/1950 | Hughey | |
| 2,547,872 A | 4/1951 | Kissick | |
| 2,587,461 A | 2/1952 | Gatimel | |
| 2,681,401 A | 6/1954 | Anderson | |
| 2,710,328 A | 6/1955 | Semple | |
| 2,795,689 A | 6/1957 | McNutt | |
| 2,806,125 A | 9/1957 | Miller | |
| 2,845,524 A | 7/1958 | Morley, Jr. | |
| 3,048,691 A | 8/1962 | Longstreth | |
| 3,121,784 A | 2/1964 | McGinty | |
| 3,137,782 A | 6/1964 | Rieppel et al. | |
| 3,179,781 A | 4/1965 | Ross | |
| 3,207,881 A | 9/1965 | Pagan | |
| 3,235,705 A | 2/1966 | Agnew et al. | |
| 3,239,648 A | 3/1966 | Syrigos | |
| 3,323,752 A | 6/1967 | Kurtz et al. | |
| 3,427,428 A | 2/1969 | Nelson et al. | |
| 3,542,996 A | 11/1970 | Bollinger | |
| 3,567,900 A | 3/1971 | Nelson et al. | |
| 3,576,966 A | 5/1971 | Sullivan | |
| 3,602,687 A | 8/1971 | Pollock | |
| 3,604,039 A | 9/1971 | Aldridge | |
| 3,676,640 A | 7/1972 | Bernard et al. | |
| 3,718,798 A | 2/1973 | Randolph et al. | |
| 3,737,614 A | 6/1973 | Paulange | |
| 3,806,691 A | 4/1974 | Roach | |
| 3,806,694 A * | 4/1974 | Nelson | B23K 9/0286 219/124.31 |
| 3,815,807 A | 6/1974 | Bartley | |
| 3,826,888 A | 7/1974 | Garfield et al. | |
| 3,835,286 A | 9/1974 | Kazlauskas | |
| 3,839,619 A | 10/1974 | Normando et al. | |
| 3,866,485 A | 2/1975 | Blatt | |
| 3,873,798 A * | 3/1975 | Friedman | B23K 9/0286 219/125.11 |
| 4,091,258 A | 5/1978 | Kano et al. | |
| 4,132,338 A | 1/1979 | Bove et al. | |
| 4,161,640 A | 7/1979 | Bromwich et al. | |
| 4,168,406 A | 9/1979 | Torrani | |
| 4,196,333 A | 4/1980 | Emmerson | |
| 4,205,828 A | 6/1980 | Hooper et al. | |
| 4,216,365 A | 8/1980 | Peyrot | |
| 4,255,641 A | 3/1981 | Connell et al. | |
| 4,298,783 A | 11/1981 | Schneider et al. | |
| 4,300,034 A | 11/1981 | Schneider et al. | |
| 4,327,898 A | 5/1982 | Grant et al. | |
| 4,331,278 A | 5/1982 | Sherer et al. | |
| 4,343,983 A | 8/1982 | Schneider et al. | |
| 4,346,279 A | 8/1982 | Lessmann et al. | |
| 4,347,421 A | 8/1982 | Mukuda et al. | |
| 4,380,695 A | 4/1983 | Nelson | |
| 4,386,726 A | 6/1983 | Taff | |
| 4,455,471 A | 6/1984 | Ecer et al. | |
| 4,495,401 A | 1/1985 | Sidorov et al. | |
| 4,527,038 A | 7/1985 | Cuny et al. | |
| 4,562,334 A | 12/1985 | Brandt | |
| 4,591,685 A | 5/1986 | Hinger et al. | |
| 4,604,770 A | 8/1986 | Lang | |
| 4,672,163 A | 6/1987 | Matsui et al. | |
| 4,687,899 A | 8/1987 | Acheson | |
| 4,728,974 A | 3/1988 | Nio et al. | |
| 4,761,596 A | 8/1988 | Nio et al. | |
| 4,841,118 A | 6/1989 | Overbay | |
| 4,856,165 A | 8/1989 | Reuchlein et al. | |
| 4,891,493 A | 1/1990 | Sato et al. | |
| 4,891,494 A | 1/1990 | Baujat | |
| 4,896,812 A | 1/1990 | Kazlauskas | |
| 4,986,002 A | 1/1991 | Oros et al. | |
| 5,047,608 A | 9/1991 | Takahashi et al. | |
| 5,099,098 A | 3/1992 | Burgoon | |
| 5,155,330 A | 10/1992 | Fratiello et al. | |
| 5,220,144 A | 6/1993 | Jusionis | |
| 5,227,601 A | 7/1993 | Black | |
| 5,655,741 A | 8/1997 | Watkins | |
| 5,692,700 A | 12/1997 | Bobeczko | |
| 5,710,403 A | 1/1998 | Jusionis | |
| 5,721,417 A | 2/1998 | Craig | |
| 5,981,897 A | 11/1999 | Offer et al. | |
| 6,029,940 A | 2/2000 | Klein | |
| 6,091,048 A | 7/2000 | Lanouette et al. | |
| 6,201,207 B1 | 3/2001 | Maruyama et al. | |
| 6,271,495 B1 | 8/2001 | Rooney | |
| 6,315,259 B1 | 11/2001 | Kolb | |
| 6,380,505 B1 | 4/2002 | Stoops et al. | |
| 6,429,405 B2 | 8/2002 | Belloni et al. | |
| 6,609,679 B1 | 8/2003 | Seidel | |
| 6,617,548 B1 | 9/2003 | Bosio | |
| 6,657,161 B2 | 12/2003 | Marhofer et al. | |
| 6,696,012 B1 | 2/2004 | Theriot | |
| 6,953,909 B2 | 10/2005 | Marhofer et al. | |
| 7,034,250 B2 | 4/2006 | Kensrue | |
| 7,176,411 B2 | 2/2007 | Enyedy | |
| 7,180,028 B2 * | 2/2007 | Flood | B23K 9/0282 219/125.1 |
| 7,205,500 B2 | 4/2007 | Watanabe et al. | |
| 7,414,220 B2 | 8/2008 | Oyster et al. | |
| 7,455,472 B2 | 11/2008 | Lehner et al. | |
| 7,952,045 B2 | 5/2011 | Tsurui et al. | |
| 8,143,549 B2 | 3/2012 | King, III et al. | |
| 8,256,659 B2 | 9/2012 | Enyedy et al. | |
| 8,338,752 B2 | 12/2012 | Enyedy et al. | |
| 8,357,876 B1 | 1/2013 | Allford et al. | |
| 2001/0015349 A1 | 8/2001 | Belloni et al. | |
| 2001/0047988 A1 | 12/2001 | Hiraoka et al. | |
| 2002/0153363 A1 | 10/2002 | Hiraoka et al. | |
| 2002/0158403 A1 | 10/2002 | Stricklen | |
| 2004/0012272 A1 | 1/2004 | Houle et al. | |
| 2004/0065644 A1 | 4/2004 | Hiraoka et al. | |
| 2004/0094514 A1 | 5/2004 | Nista et al. | |
| 2005/0098551 A1 | 5/2005 | Hiraoka et al. | |
| 2005/0218132 A1 | 10/2005 | Wells | |
| 2005/0269313 A1 | 12/2005 | Vinegar et al. | |
| 2006/0044089 A1 | 3/2006 | Kang et al. | |
| 2006/0076320 A1 * | 4/2006 | Watanabe | B23K 9/0213 219/75 |
| 2007/0012671 A1 | 1/2007 | Hiraoka et al. | |
| 2007/0017912 A1 | 1/2007 | Flood et al. | |
| 2007/0119829 A1 | 5/2007 | Vietz et al. | |
| 2007/0297556 A1 | 12/2007 | Spencer et al. | |
| 2008/0197116 A1 * | 8/2008 | Achtner | B23K 9/133 219/75 |
| 2008/0230526 A1 | 9/2008 | Hiraoka et al. | |
| 2009/0039059 A1 | 2/2009 | Twarog et al. | |
| 2009/0242352 A1 | 10/2009 | Altonji et al. | |
| 2010/0025907 A1 | 2/2010 | Strahm et al. | |
| 2010/0133239 A1 | 6/2010 | Gunzelmann | |
| 2010/0183360 A1 | 7/2010 | Nguyen et al. | |
| 2011/0042365 A1 | 2/2011 | Hiraoka et al. | |
| 2011/0072874 A1 | 3/2011 | Basler et al. | |
| 2011/0132877 A1 | 6/2011 | Miller et al. | |
| 2012/0118864 A1 * | 5/2012 | L'Arvor | B23K 9/1278 219/124.1 |
| 2013/0126494 A1 | 5/2013 | Miller et al. | |
| 2013/0126496 A1 | 5/2013 | Miller et al. | |
| 2013/0199323 A1 | 8/2013 | Fong et al. | |
| 2013/0277337 A1 | 10/2013 | Murata | |
| 2013/0306710 A1 | 11/2013 | Kim et al. | |

(56) References Cited

U.S. PATENT DOCUMENTS

FOREIGN PATENT DOCUMENTS

| EP | 1779963 | 2/2007 |
|---|---|---|
| EP | 2020272 | 2/2009 |
| EP | 2106872 | 10/2009 |
| EP | 2216120 | 8/2010 |
| EP | 2216121 | 8/2010 |
| EP | 2216122 | 8/2010 |
| EP | 2216123 | 8/2010 |
| EP | 2495817 | 9/2012 |
| GB | 848941 | 9/1960 |
| GB | 1142854 | 2/1969 |
| GB | 1272568 | 5/1972 |
| JP | 55100877 | 8/1980 |
| JP | S58 179573 A | 10/1983 |
| JP | S6199581 A | 5/1986 |
| JP | H02255272 | 10/1990 |
| JP | H07111759 | 10/1993 |
| KR | 20120025801 A | 3/2012 |
| NL | 7401239 | 1/1974 |
| SU | 322247 | 9/1970 |
| WO | 95/23060 | 8/1995 |
| WO | 03/044375 A1 | 5/2003 |
| WO | 2008025553 | 3/2008 |
| WO | 2010/089184 | 8/2010 |
| WO | 2012020249 A2 | 2/2012 |
| WO | 2012/097626 | 7/2012 |

OTHER PUBLICATIONS

Using compact, full-function weld heads; 2013 Limited Clearance/Arc Machines, Inc., 10500 Orbital Way, Pacoima, CA 91331; Mar. 14, 2013.
Accra Wire Website, section on Weld Wire Dereelers, http://www.accuainc.com/weldwire.html, 3 pages, retrieved Nov. 13, 2014.
International Preliminary Report on Patentability issued PCT/IB2015/001075, mailed Jan. 19, 2017.

* cited by examiner

ORBITAL WELDER WITH WIRE HEIGHT ADJUSTMENT ASSEMBLY

This application claims priority to and the benefit of U.S. Provisional Patent Application 61/903,312, filed on Nov. 12, 2013.

TECHNICAL FIELD

Embodiments of the present invention relate to welding systems, devices, and processes. More particularly, the present invention relates to an orbital welding system having a wire alignment assembly.

BACKGROUND

In industrial applications, Welding operations may involve, brazing, cladding, building up, filling, hard facing, overlaying, joining, laser welding and heat produced by plasma, laser and flame welding and cutting operations heats surrounding components, which may cause these components to operate with less efficiently on head to premature wear or failure. For brevity sake, these welding operations will be referred to collectively as welding. An orbital welder may be used when welding a curved surface. The welder may be moved about the surface or the surface may be rotated while the welder remains stationary. The most common example, where orbital welding is used, is the welding of pipe. Pipe welding may include thin wall applications or deep groove geometries where the welding electrode extends into a groove formed between the two pipes being joined to lay down successive beads of weld material to fill the groove.

For TIG welding a consumable wire is used to lay down the successive beads. The wire is introduced near an electrode with the arc from the electrode melting the wire and creating deposition of the molten metal. Proper alignment of the wire with the electrode in the welding zone is needed to obtain the best results.

SUMMARY OF THE INVENTION

The present invention generally provides, in embodiments, a welding wire alignment system adapted to align the welding wire with an electrode on a welding torch. The welding wire alignment system includes a welding system for applying a weld to a workpiece, the welding system including a frame, a welding torch mounted on the frame, the welding torch including an electrode; a wire guide adapted to direct a consumable wire toward the electrode; a wire alignment assembly including a fixture frame having a wire guide holder mounted thereon, the wire guide being supported on the wire guide holder; the fixture frame being pivotally mounted on the frame to allow vertical adjustment of the wire guide and fixable in a selected rotational position relative to the frame; wherein the fixture frame further including an adjustment member pivotable about a vertical axis and supported on the fixture frame, an alignment screw adapted to fix the adjustment member in a selected position about the vertical axis; wherein the wire guide holder supported on the adjustment member and is rotatable about a horizontal axis and selectively fixed in a selected position about the horizontal axis.

The present invention further provides a wire guide holder in a welding system used in orbital welding where a wire is provided to a wire guide to direct the wire toward an electrode in the welding system, the wire guide holder including a bracket defining a guide bore and a shaft extending from the bracket, the shaft defining an axially extending threaded bore having an open end at an outward end of the shaft; and a set screw threadably received within the bore and having a tool receiver that is accessible from the open end of the shaft.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION OF THE DRAWINGS

Figure 5:
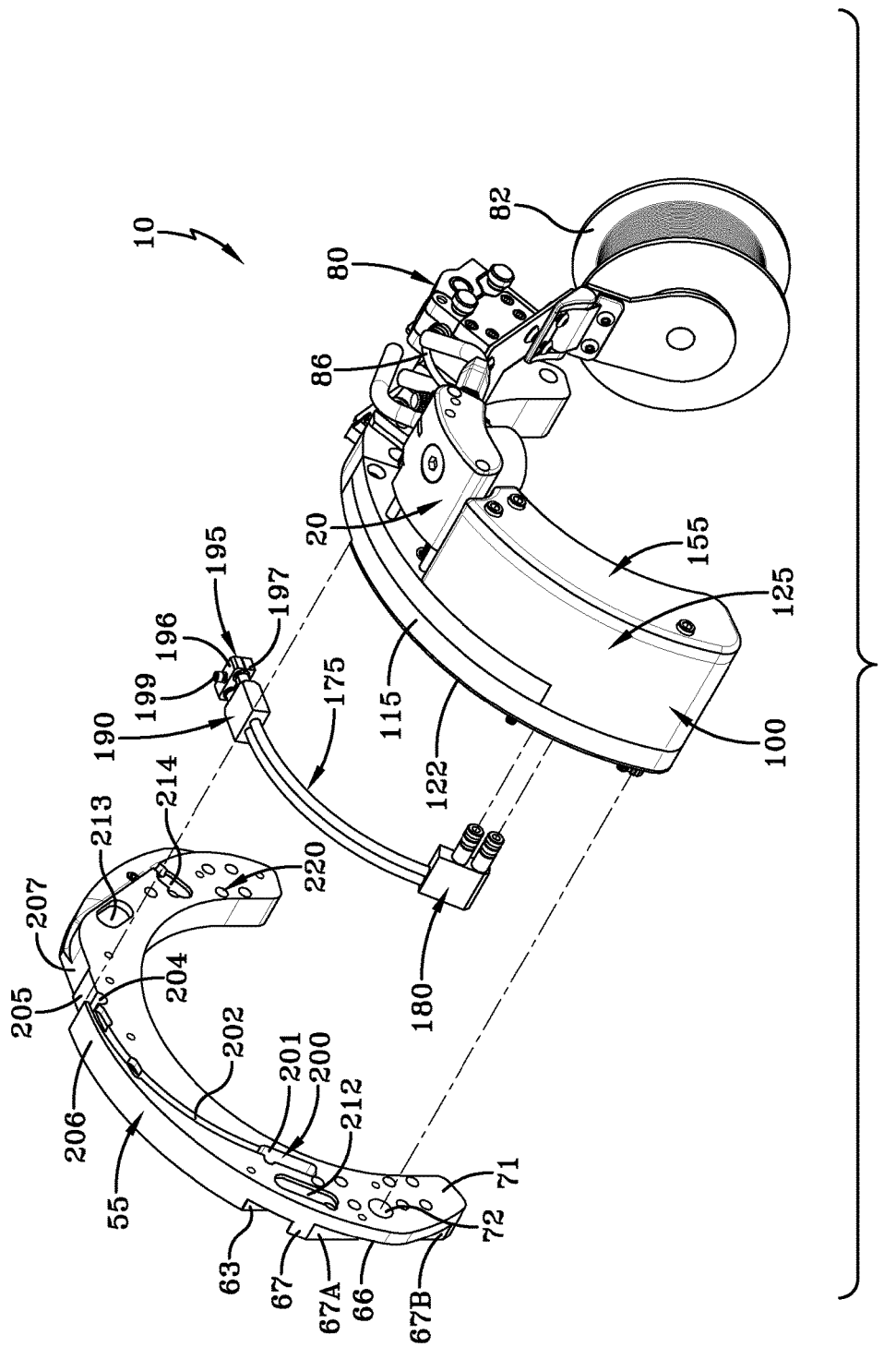

FIG. 5. is an exploded from perspective view showing details of a coolant supply assembly.

Figure 6:
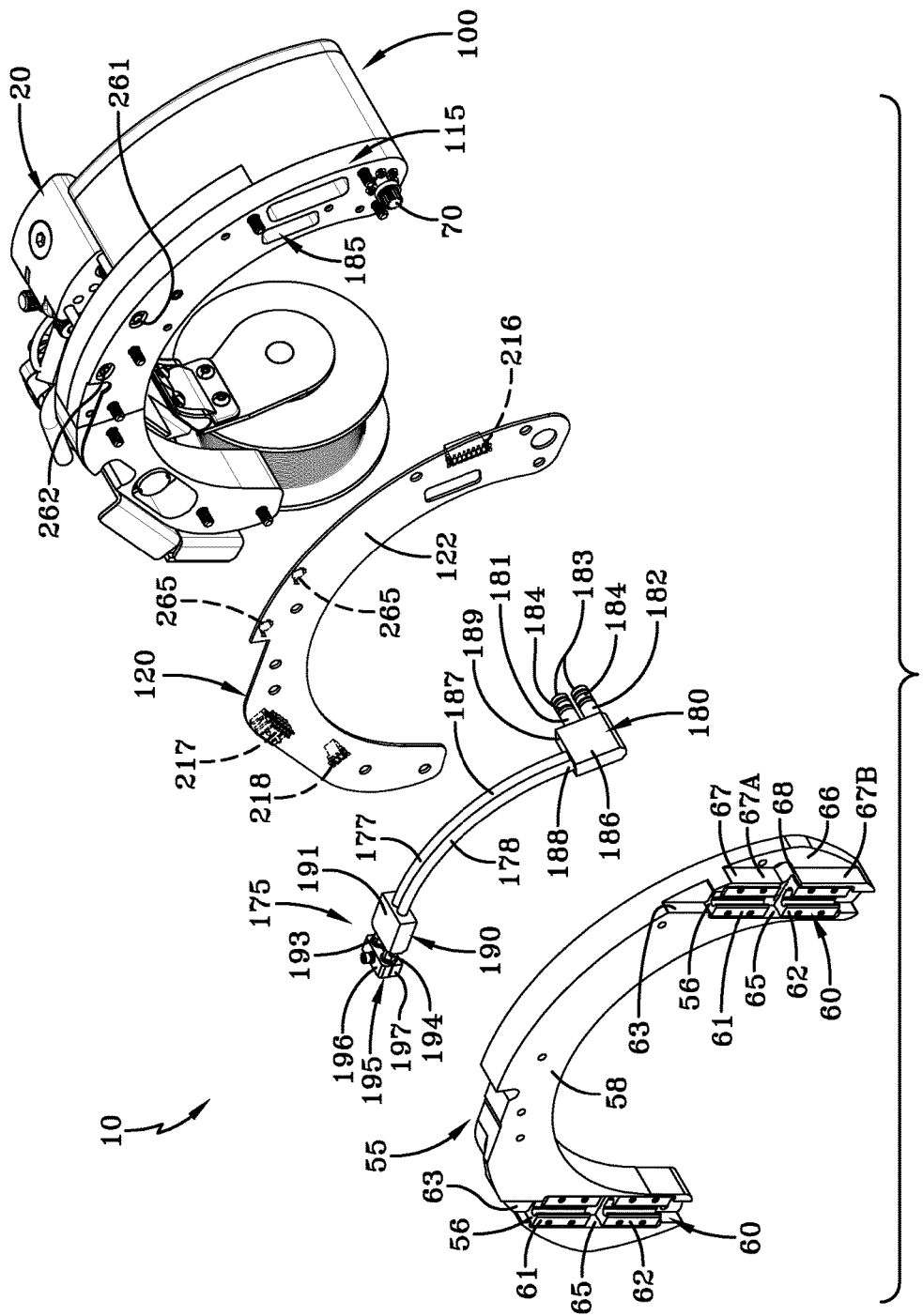

FIG. 6 is an exploded rear perspective view showing further details of the coolant supply assembly.

Figure 7:
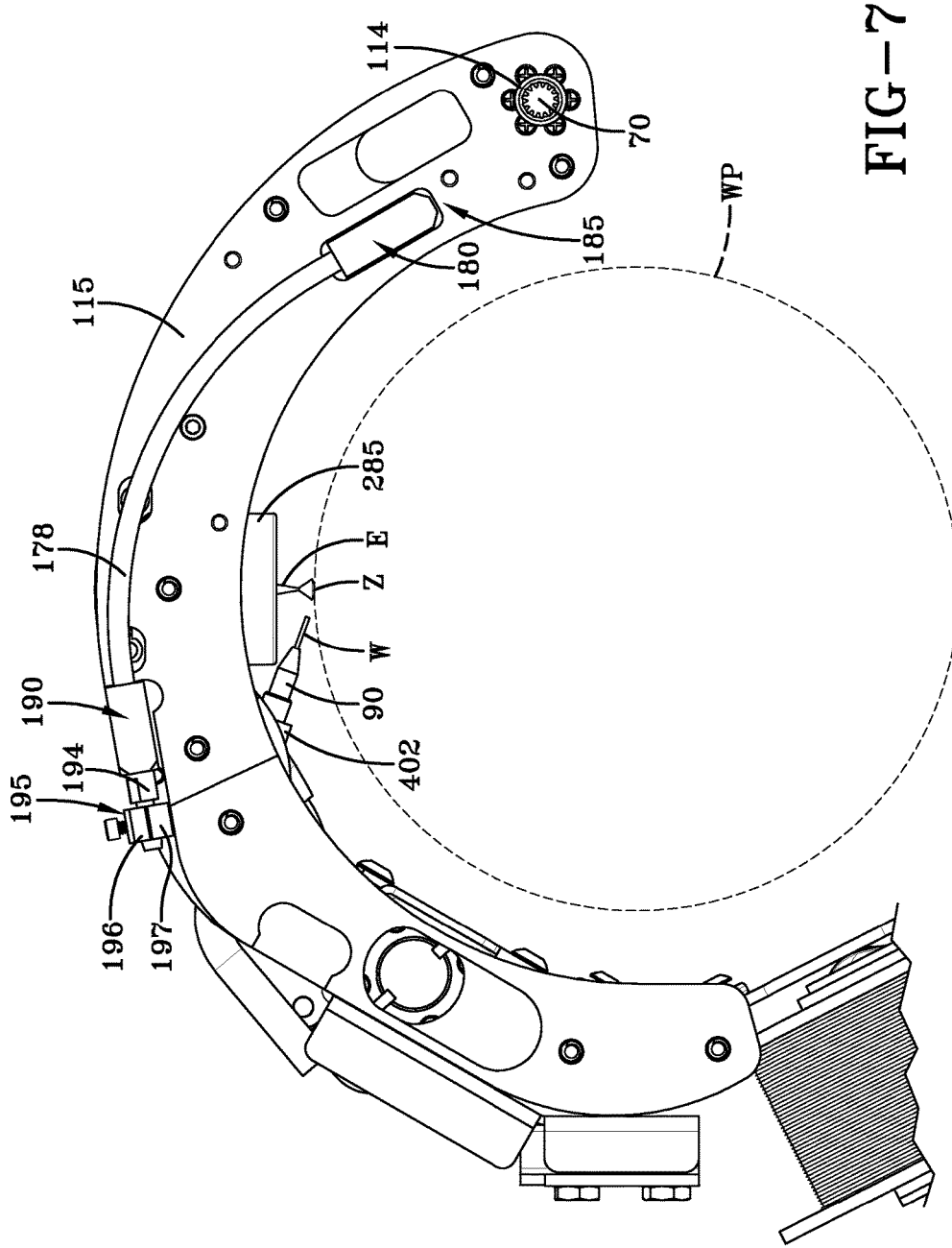

FIG. 7 is a rear elevation view of the welding head assembly showing further details of the coolant supply assembly.

Figure 8:
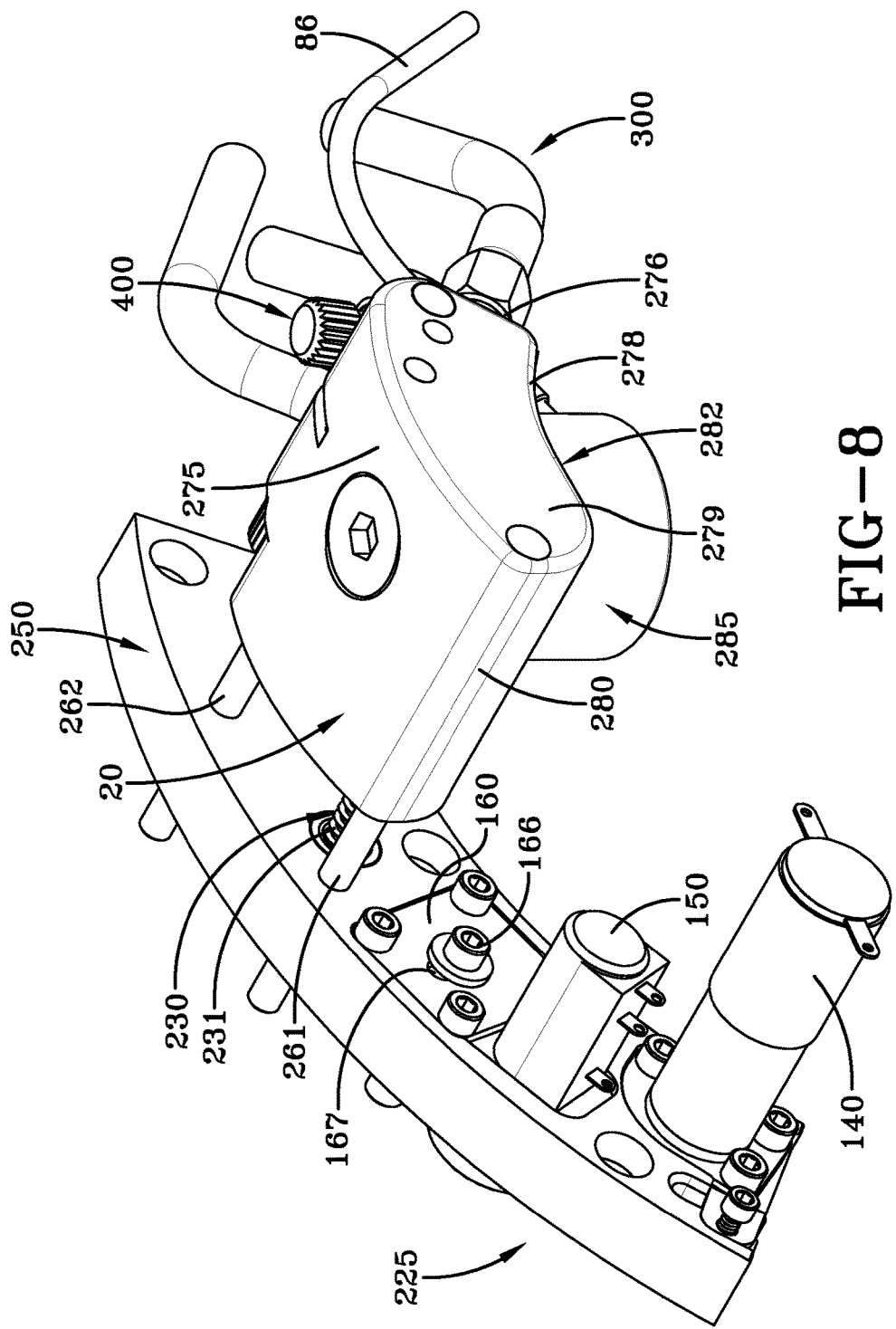

FIG. 8 is a top perspective view of a portion of the welding assembly showing details of the drive assembly for the torch head.

Figure 9:
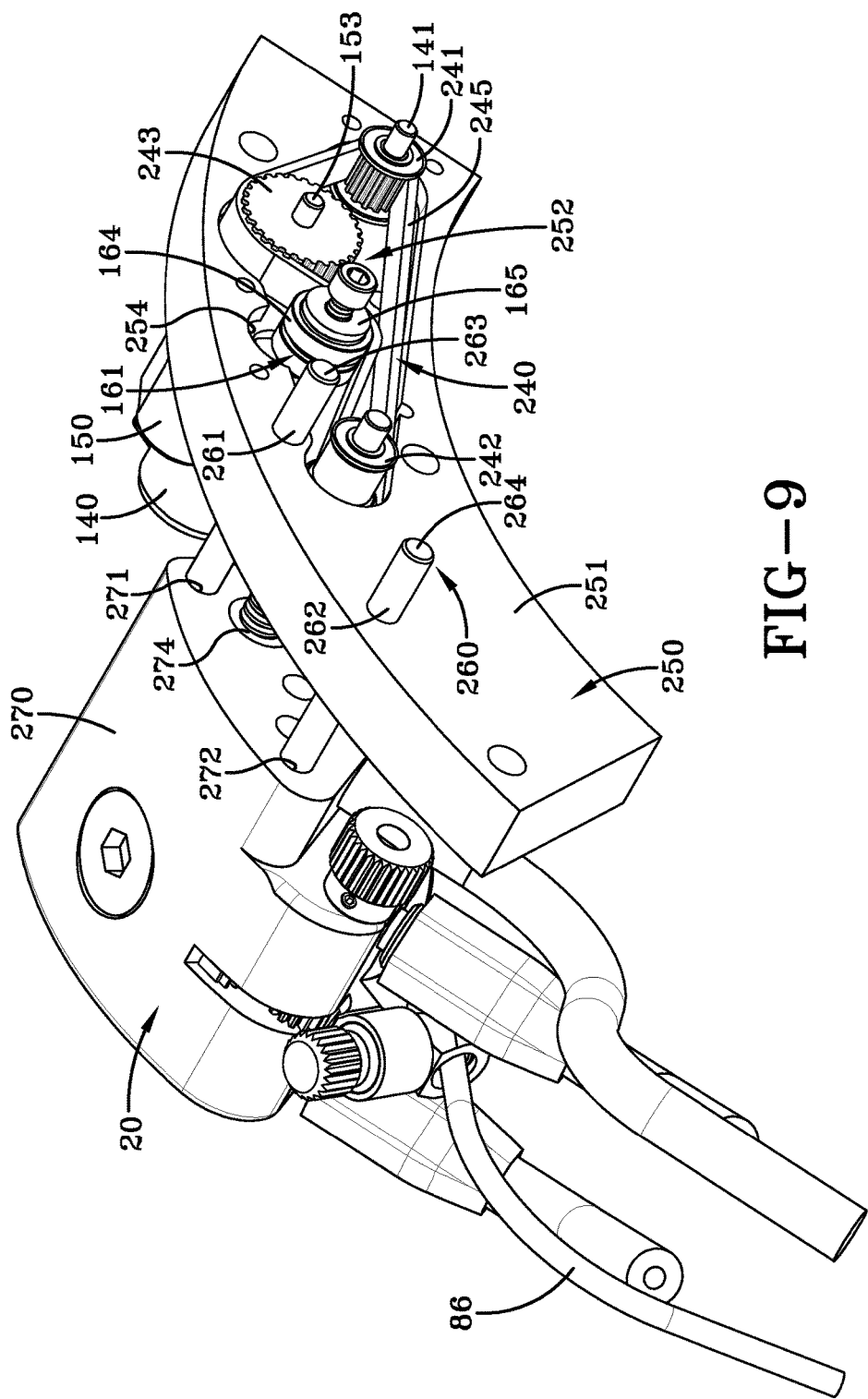

FIG. 9 is a right side rear perspective view partially cut away to show details of the drive assembly for the torch head of the present invention.

Figure 10:
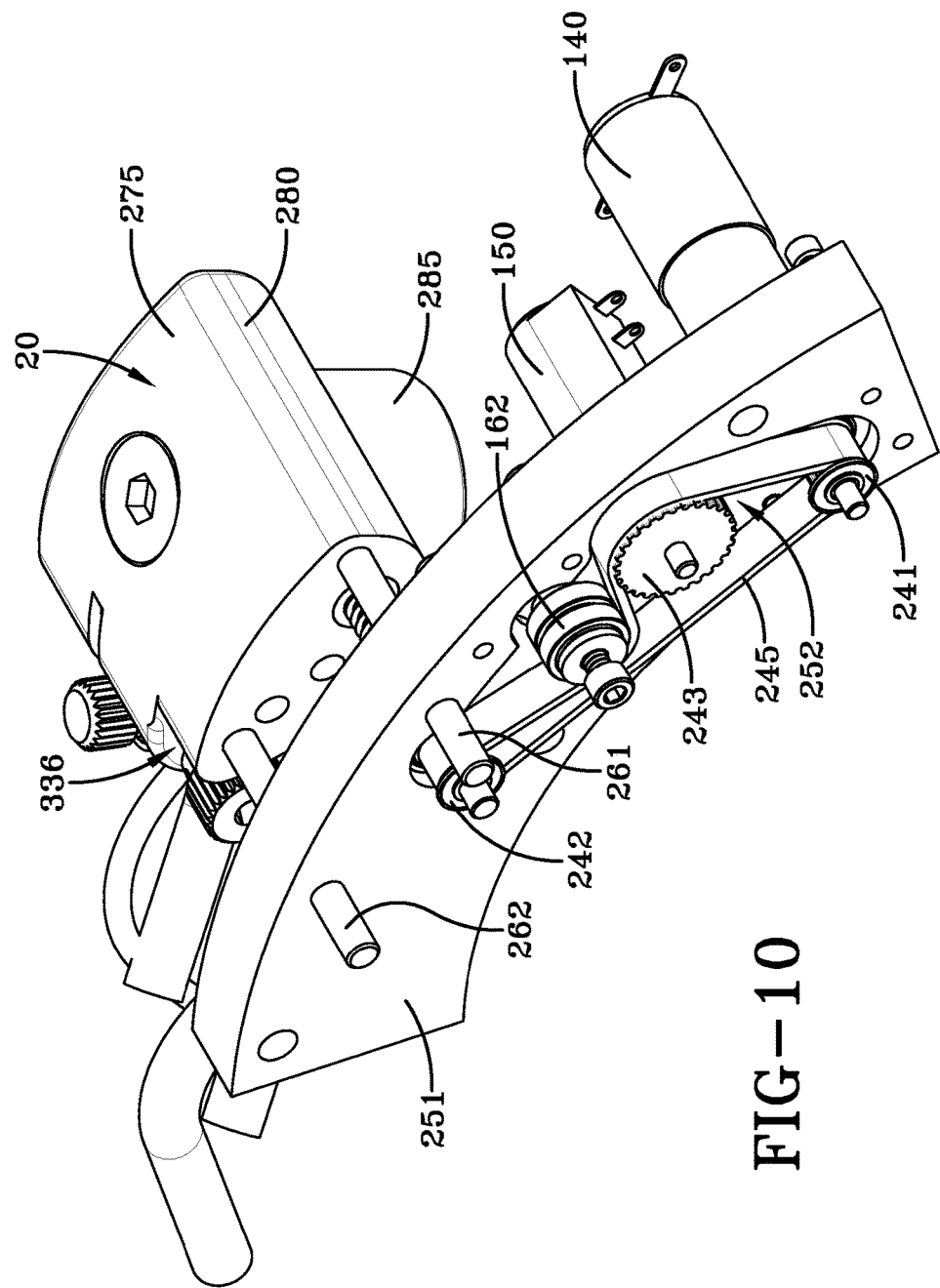

FIG. 10 is a left side perspective view similar to FIG. 9.

Figure 11:
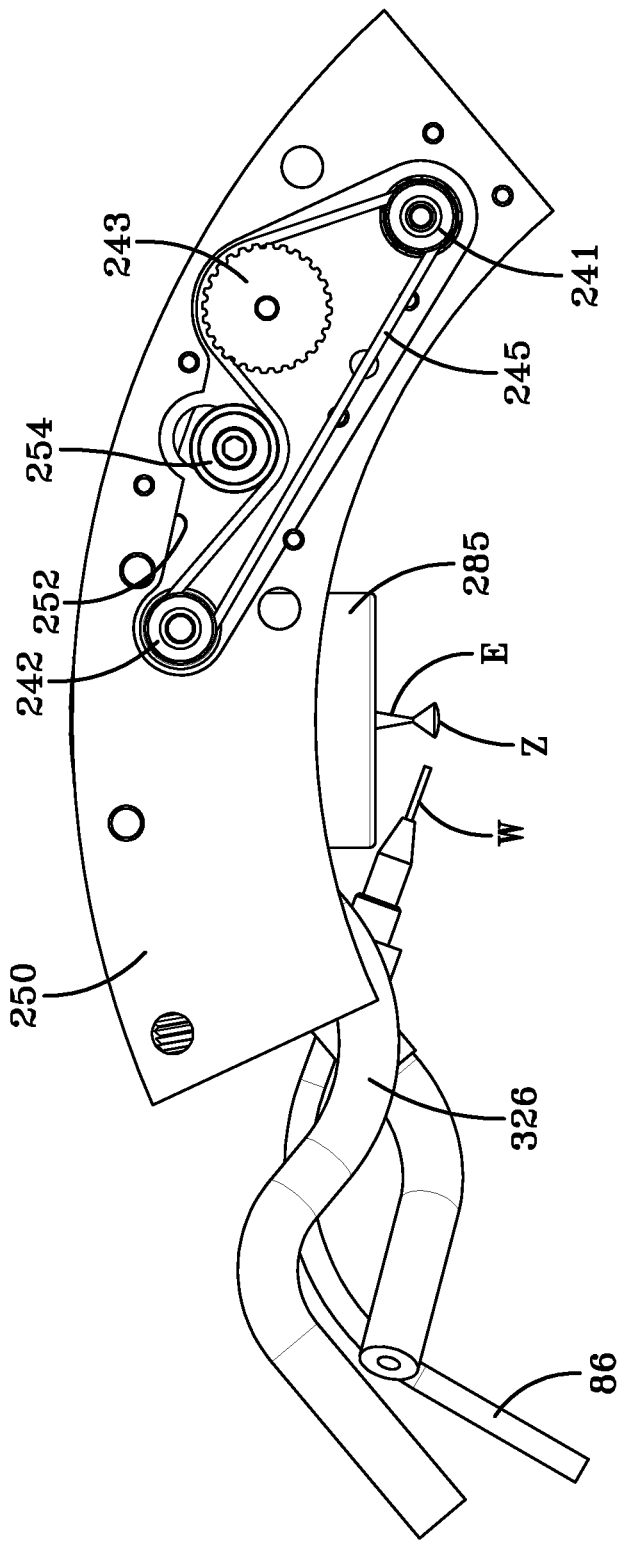

FIG. 11 is a rear elevational view showing further details of the drive assembly for the torch head.

Figure 12:
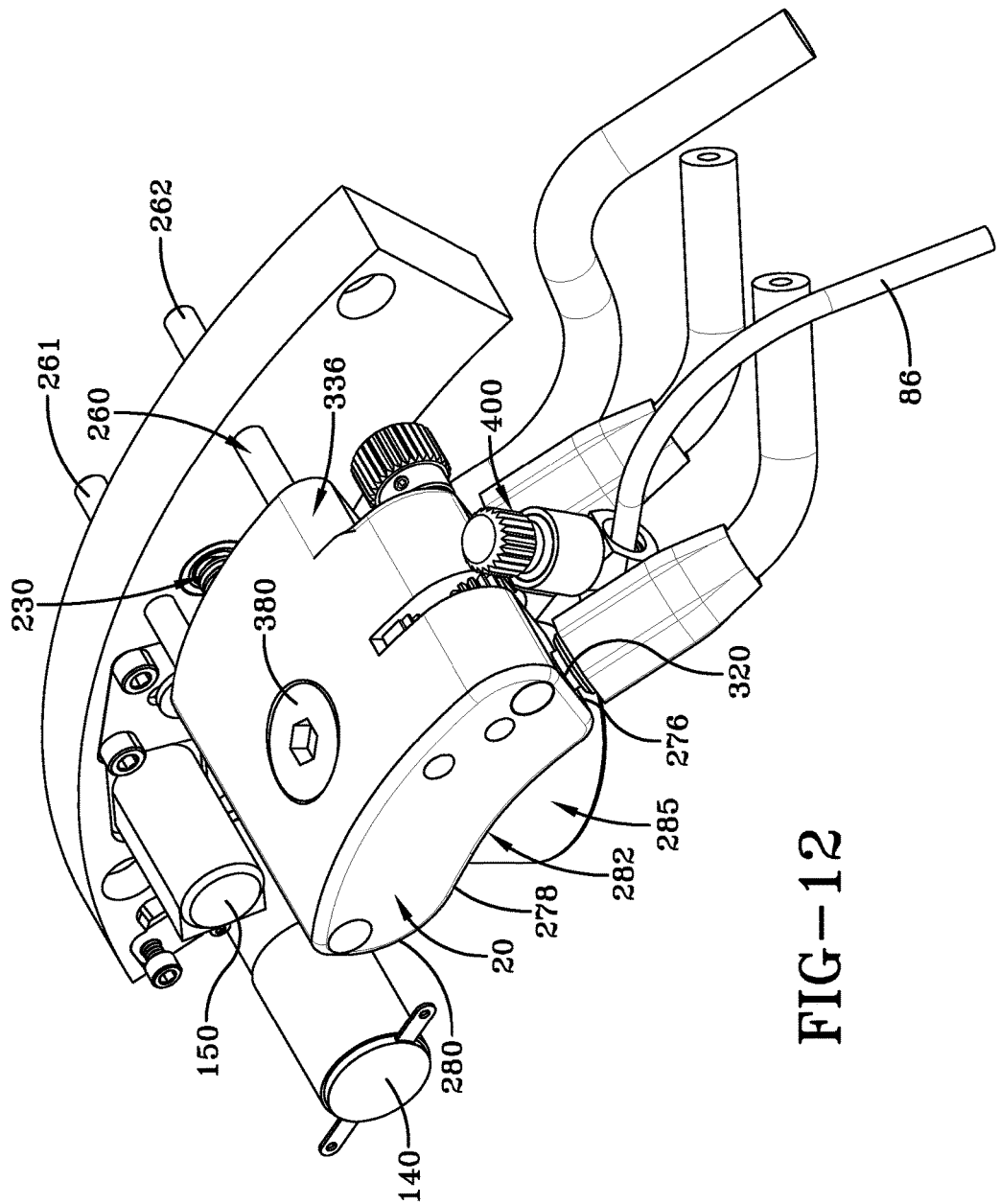

FIG. 12 is a right side front perspective view of a portion of the welding system showing details of a torch head fluid supply assembly.

Figure 13:
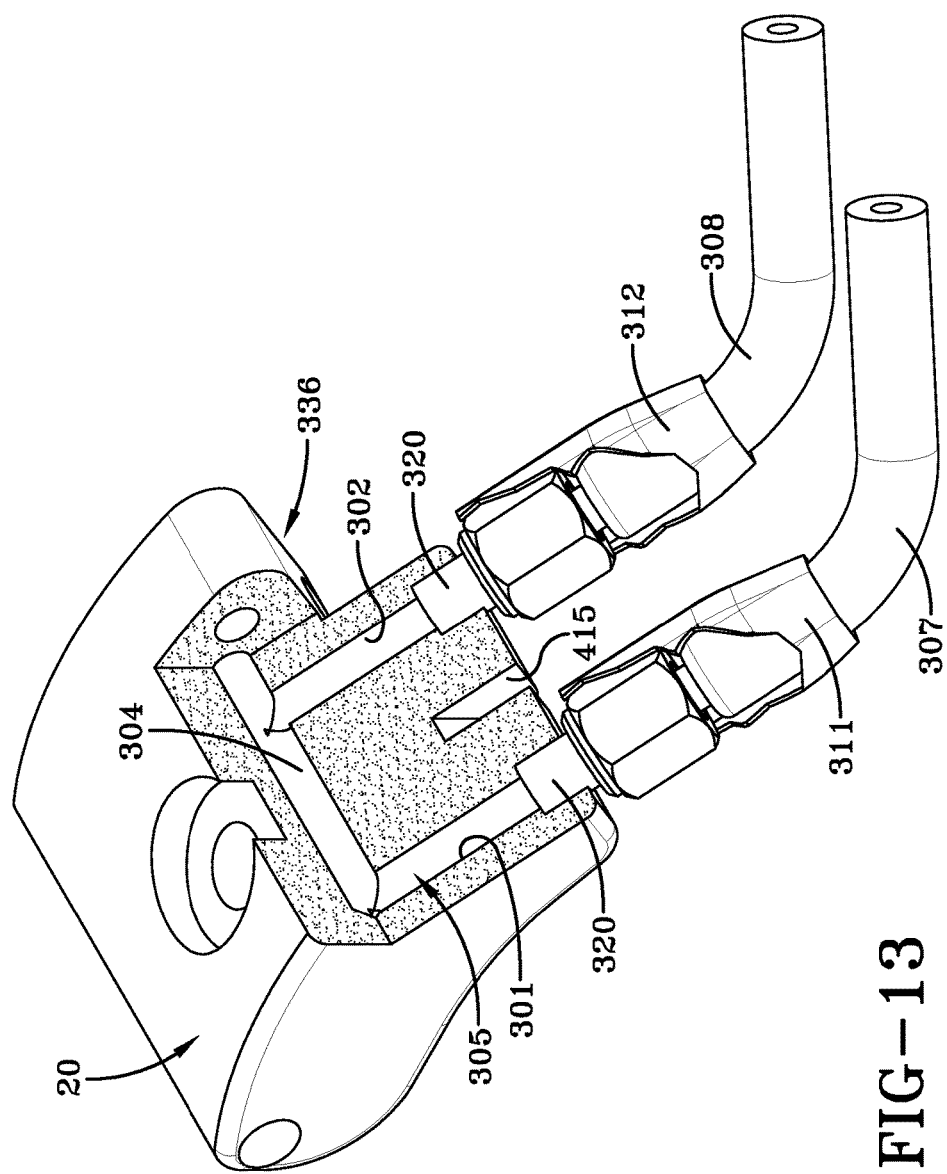

FIG. 13 is a top perspective view of a front side of the torch head with a portion cut away to show details of a coolant passage in the fluid supply assembly.

Figure 14:
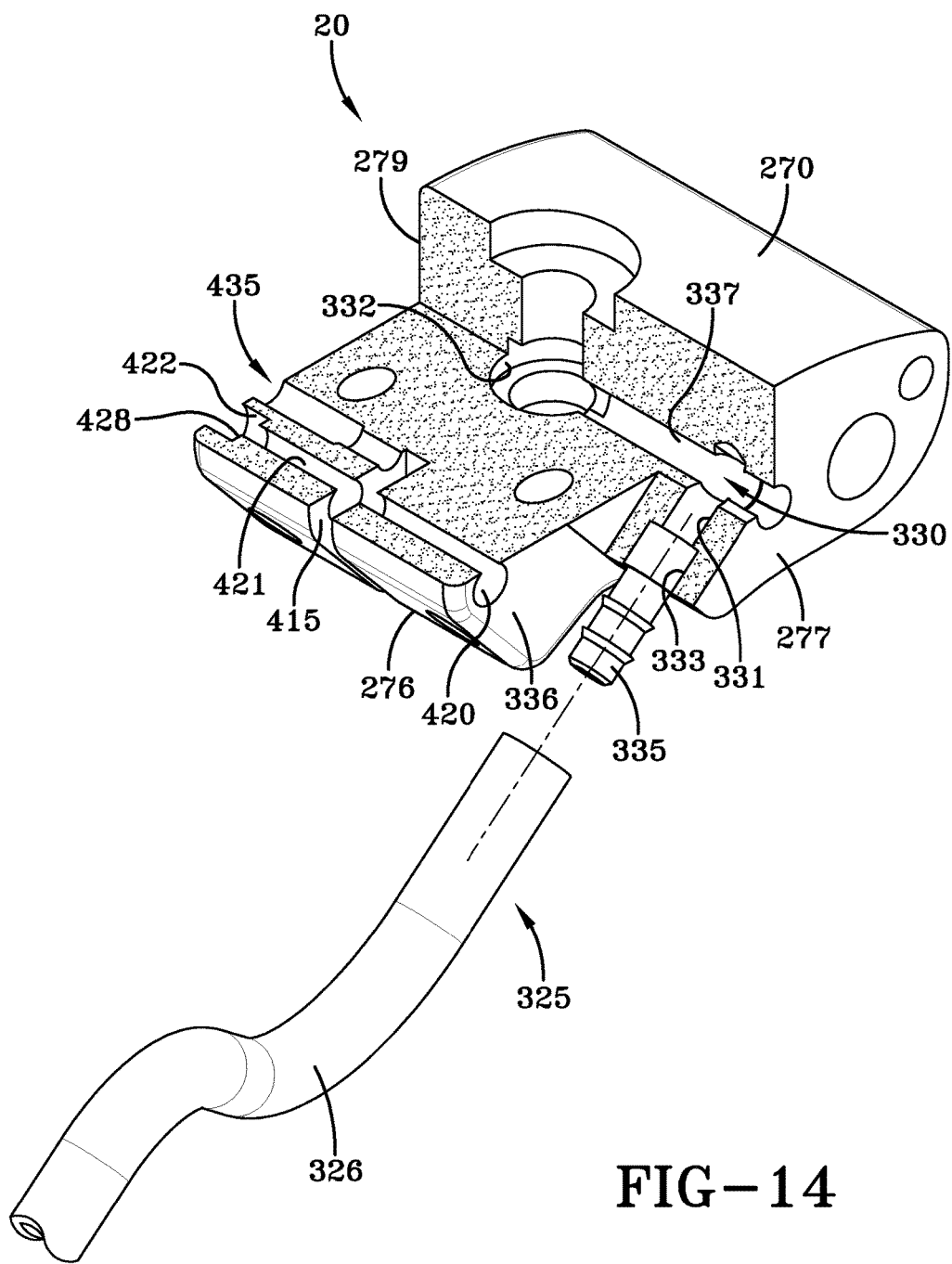

FIG. 14 is rear perspective view similar to FIG. 13 with additional portions cut away to show details of a shielding gas supply assembly in the fluid supply assembly for the torch head.

Figure 15:
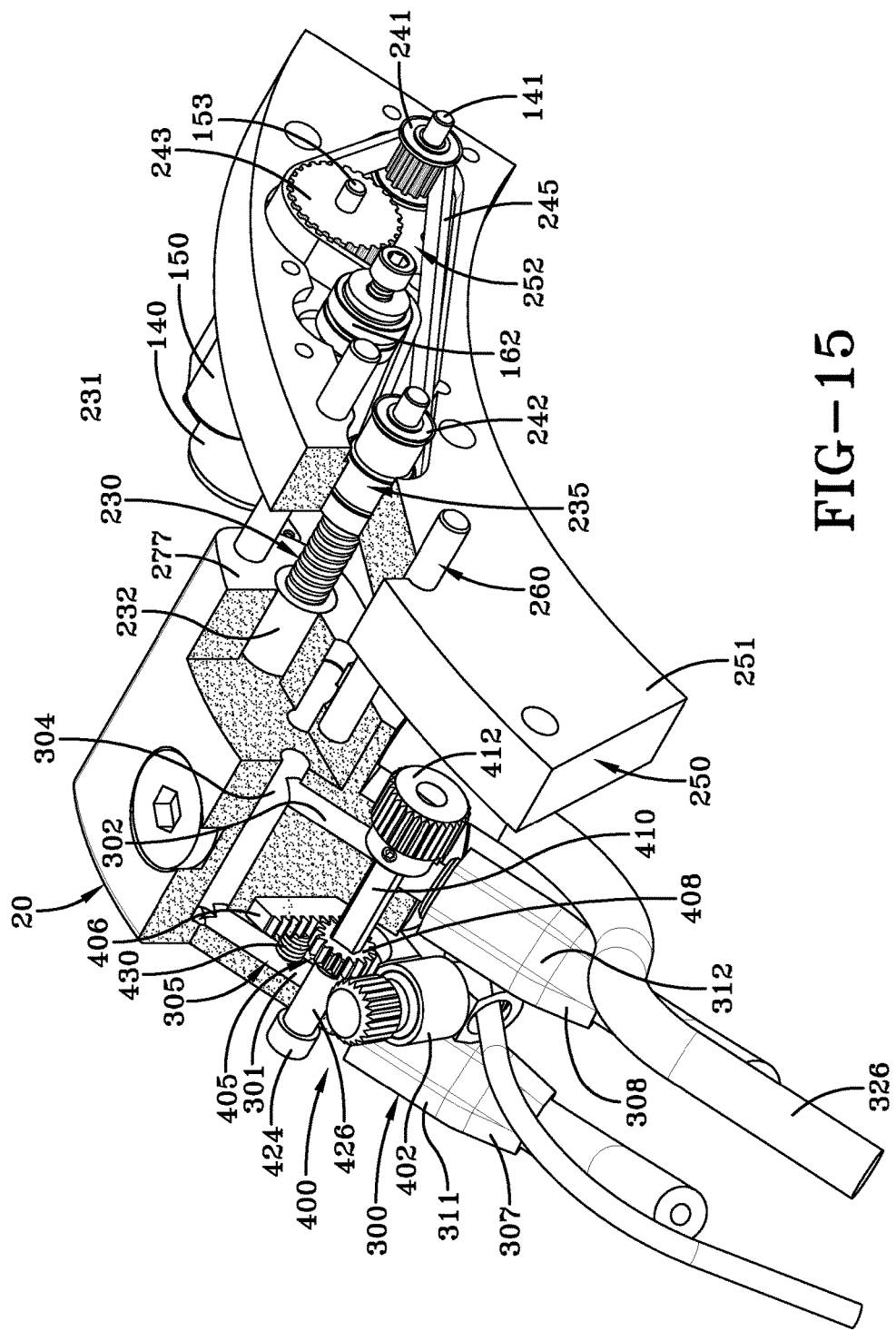

FIG. 15 is a top perspective view of a portion of the welding system and is partially cut away to show details of the torch head assembly and drive assembly.

Figure 16:
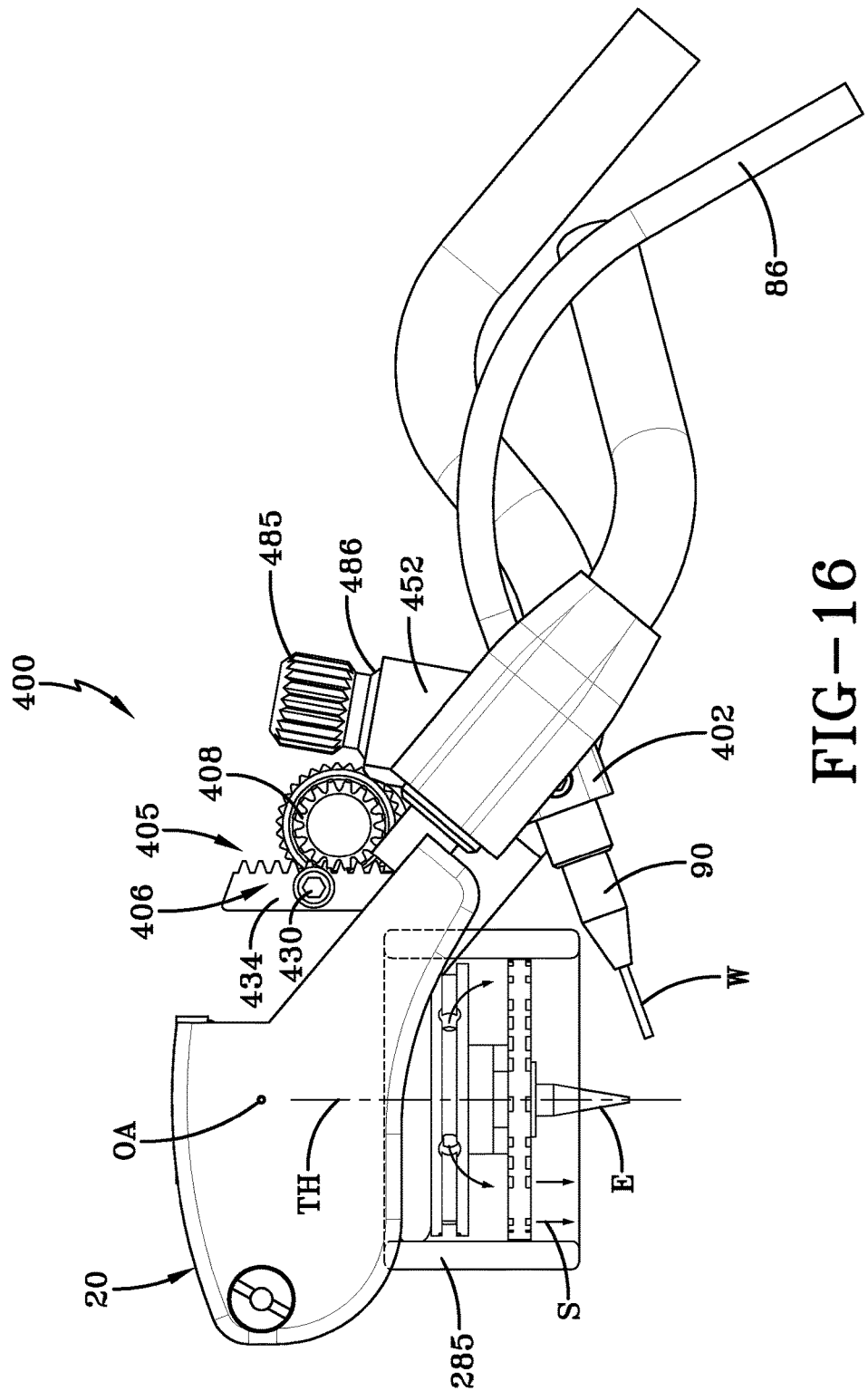

FIG. 16 is a front elevational view of the torch head assembly partially cut away to show details of a wire height adjustment assembly.

Figure 17:
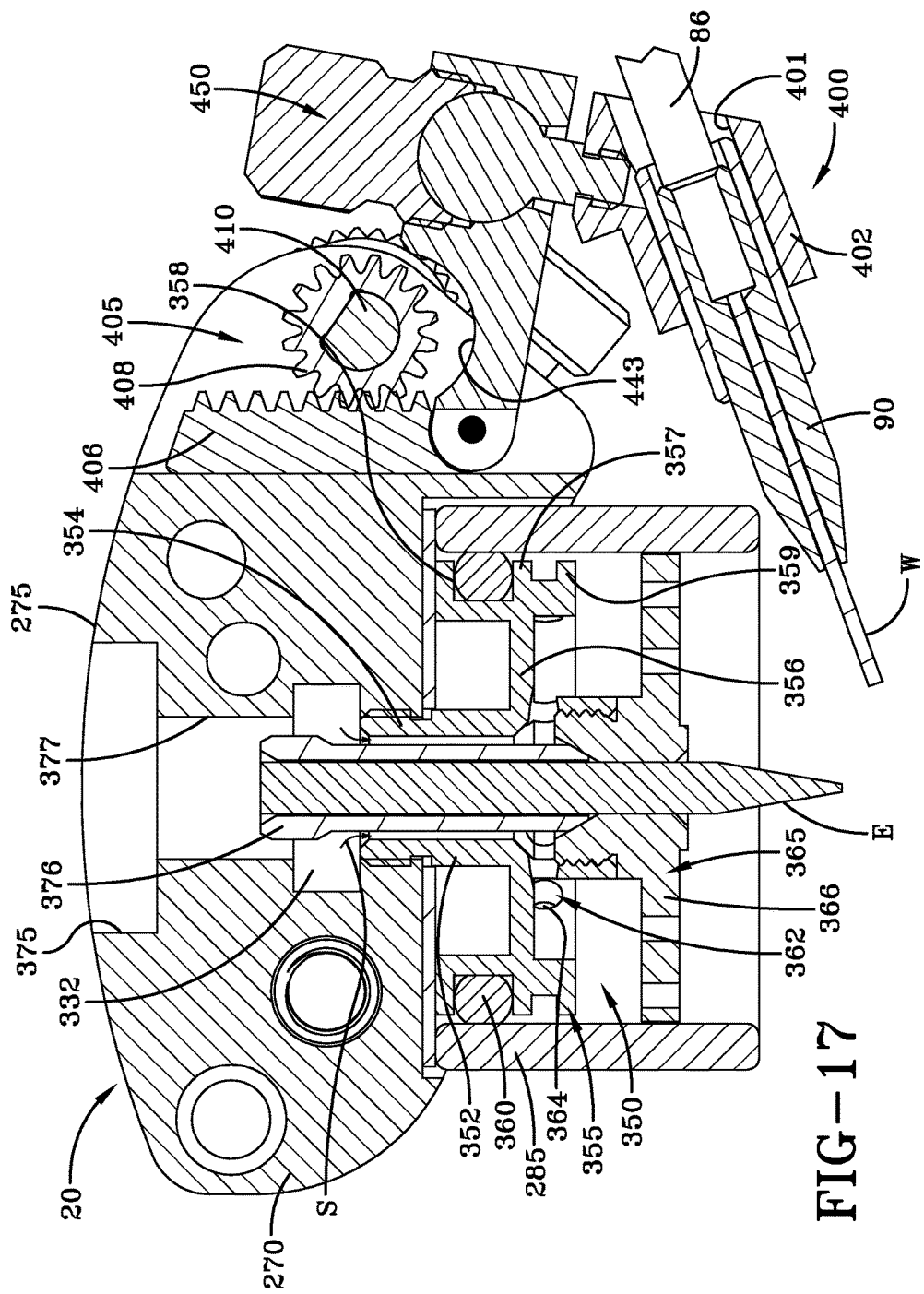

FIG. 17 is a sectional front elevational view similar to FIG. 16 showing further details of the wire alignment assembly.

Figure 18:
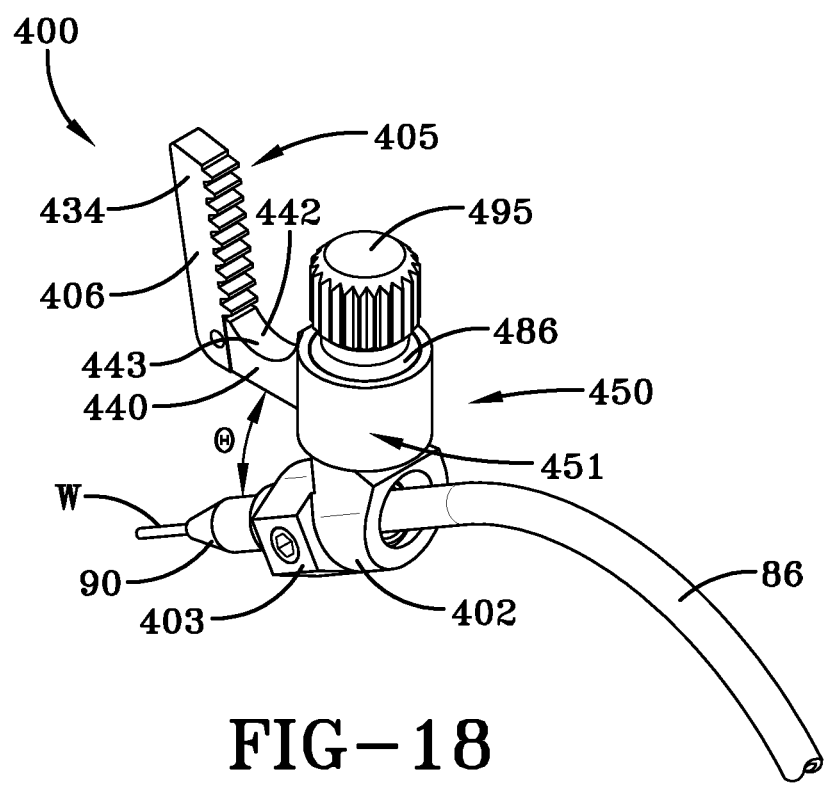

FIG. 18 is a first perspective view of the alignment assembly.

Figure 19:
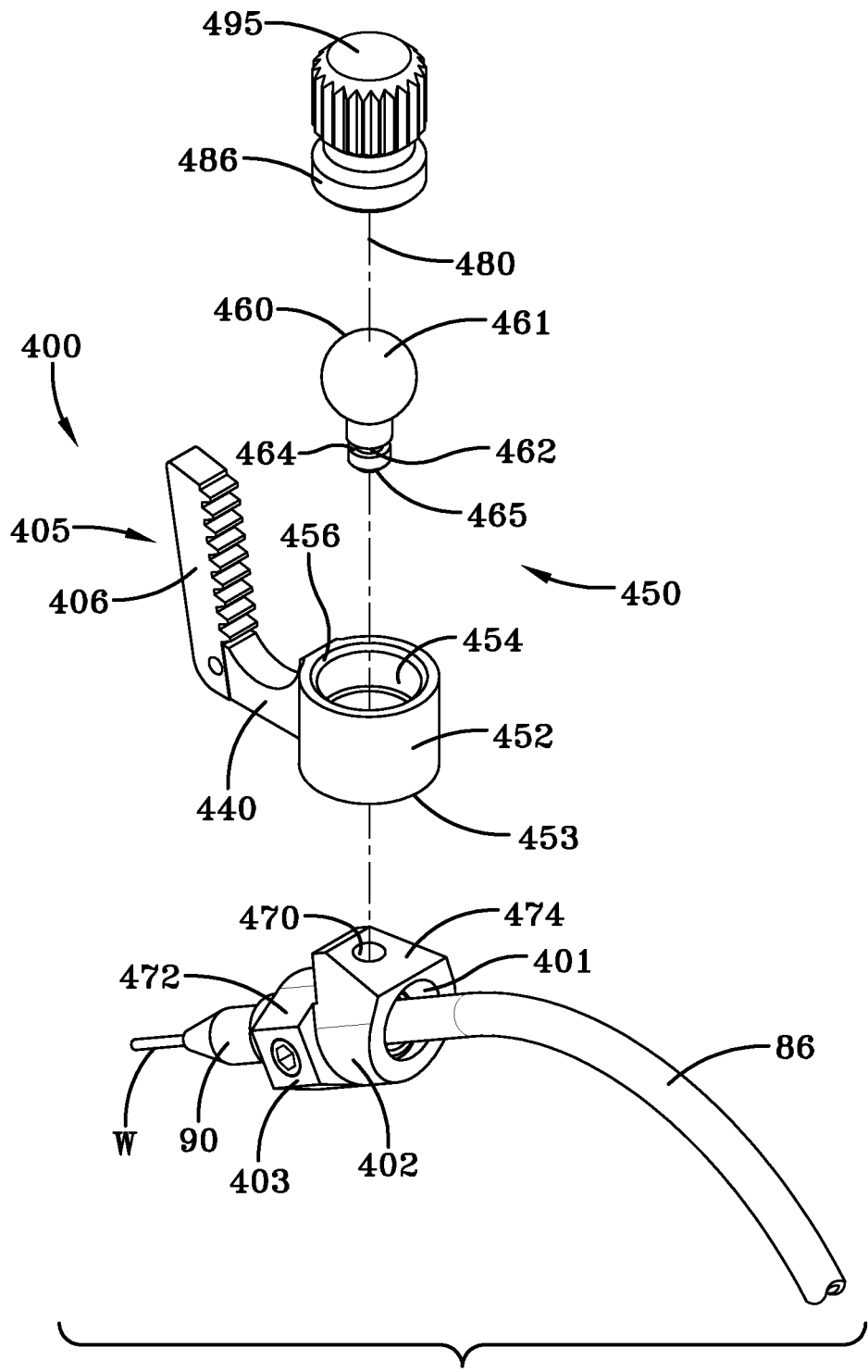

FIG. 19 is an exploded perspective view of the wire alignment assembly.

Figure 20:
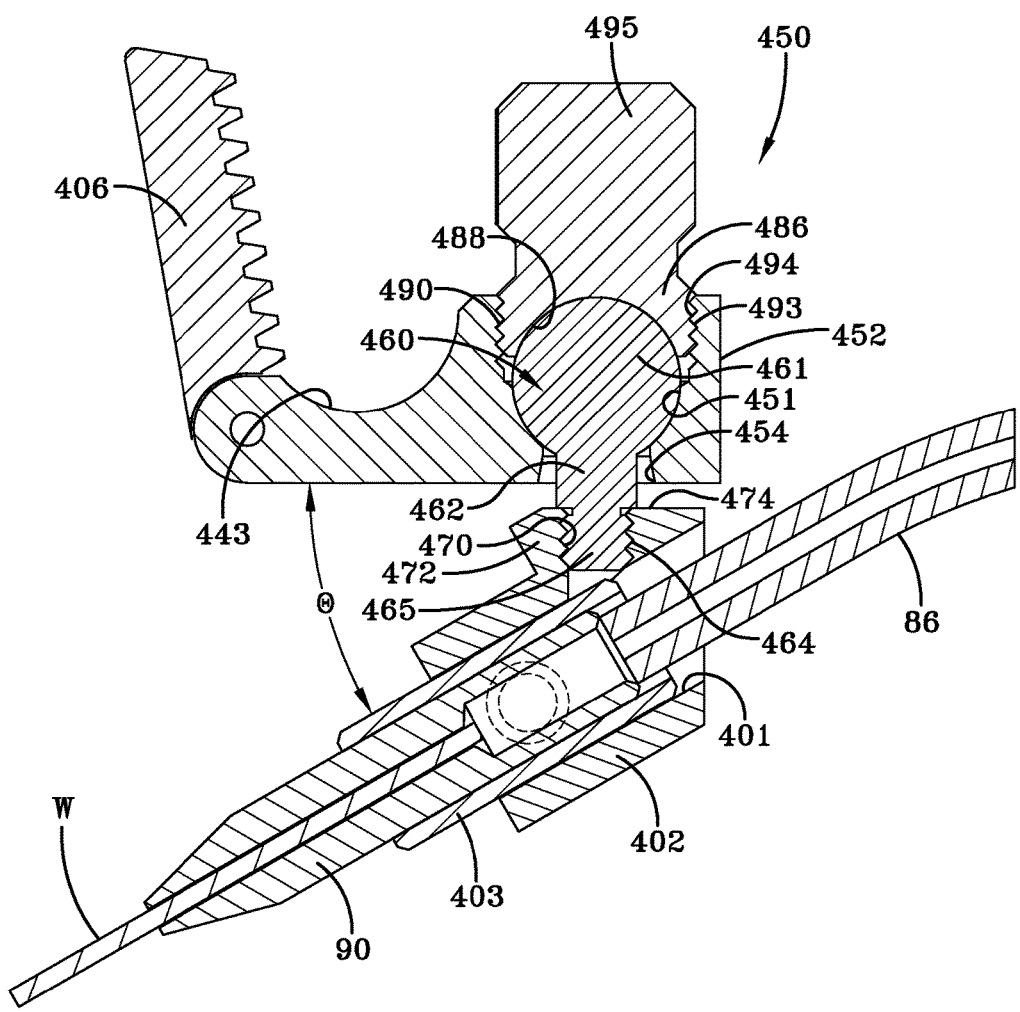

FIG. 20 is a sectional side elevation view of a wire alignment assembly

Figure 21:
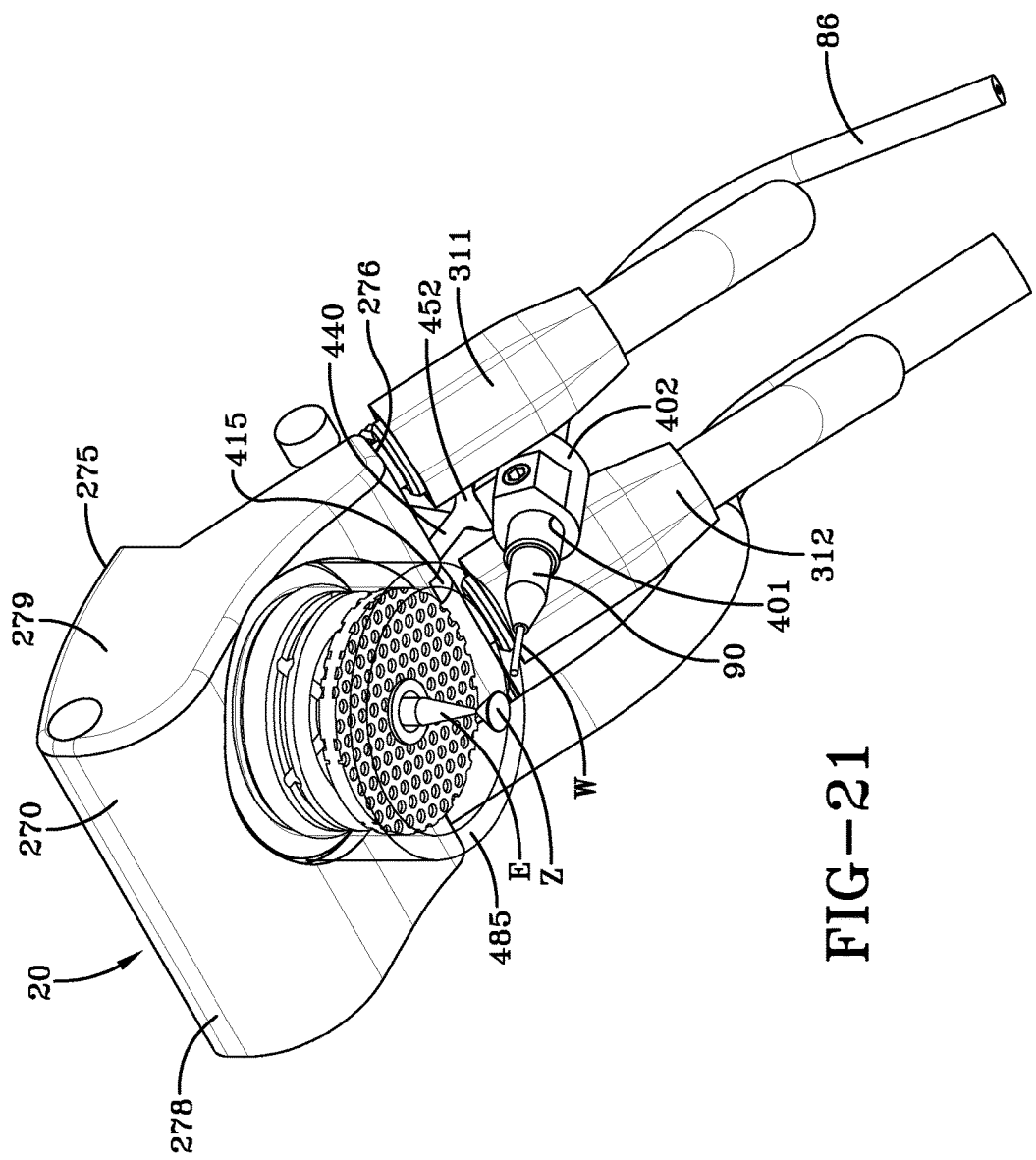

FIG. 21 is bottom perspective view of the torch head showing details of the shielding gas distribution assembly.

Figure 22:
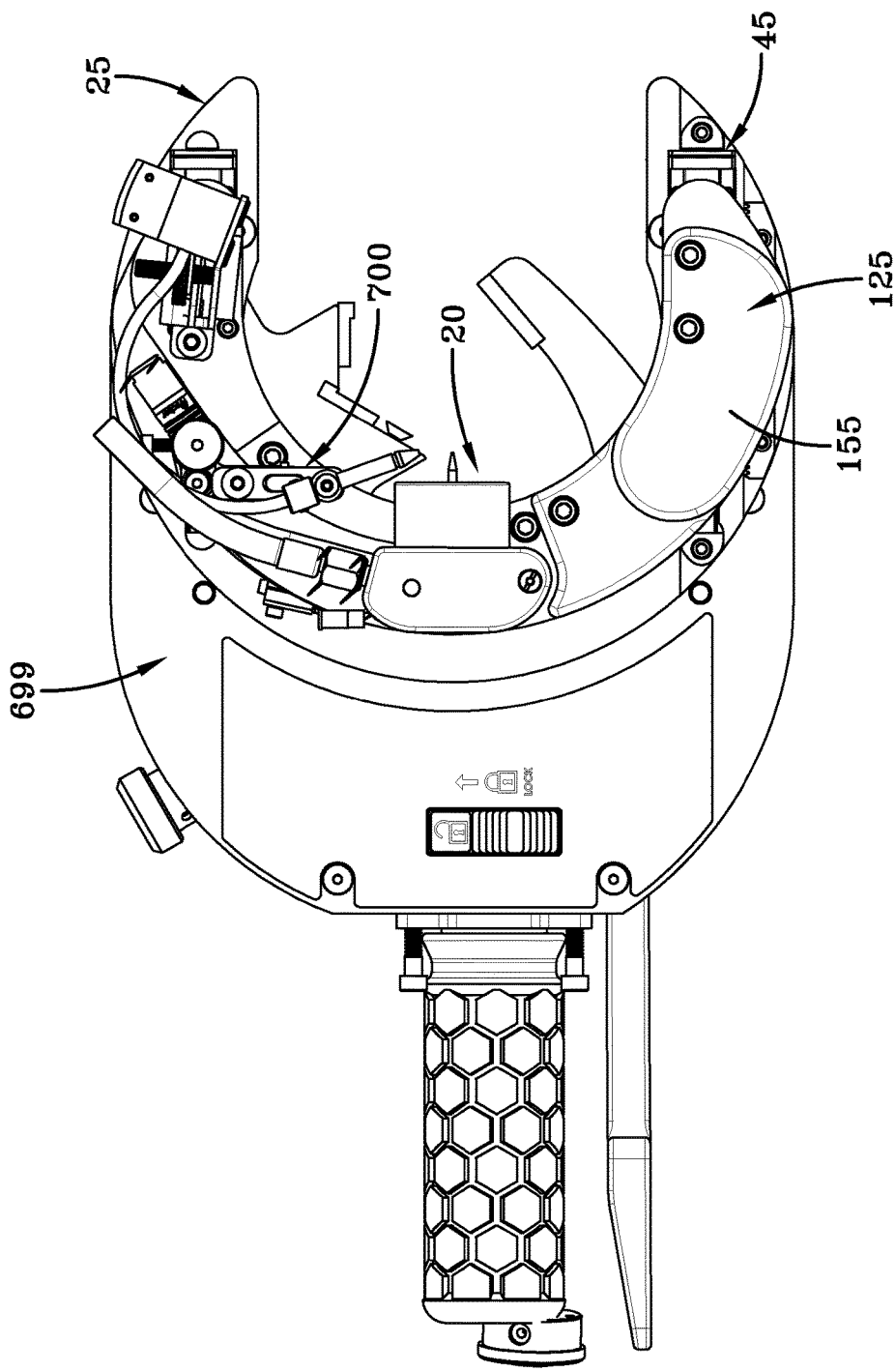

FIG. 22 is a front elevational view of a welding system having an alternative wire height adjustment assembly.

Figure 23:
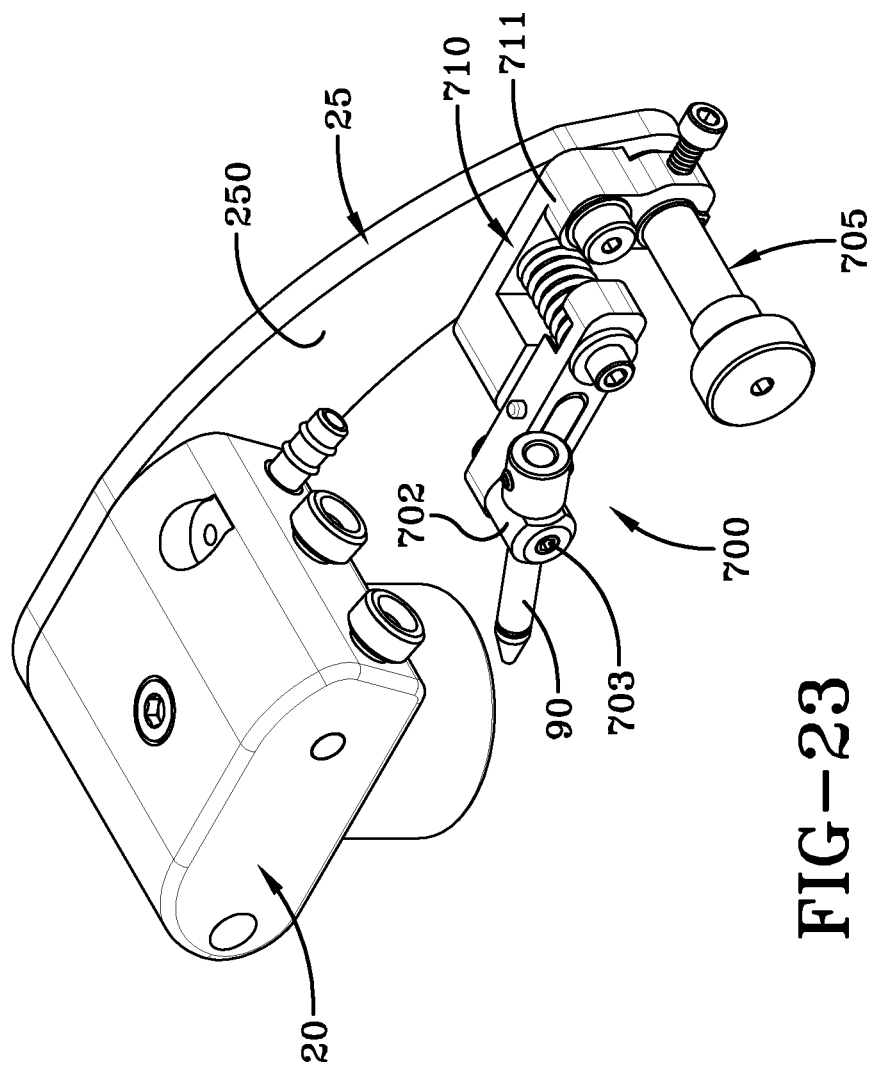

FIG. 23 is an enlarged perspective view of the welding torch assembly showing further details of the alternative wire height adjustment assembly.

Figure 24:
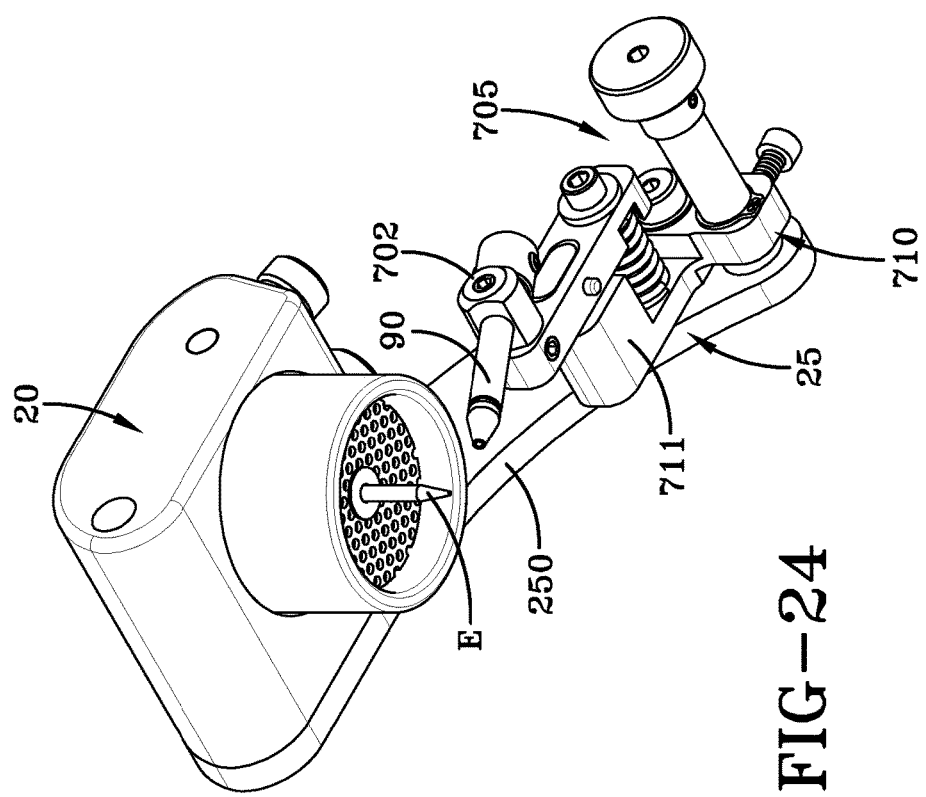

FIG. 24 is a bottom perspective thereof.

Figure 25:
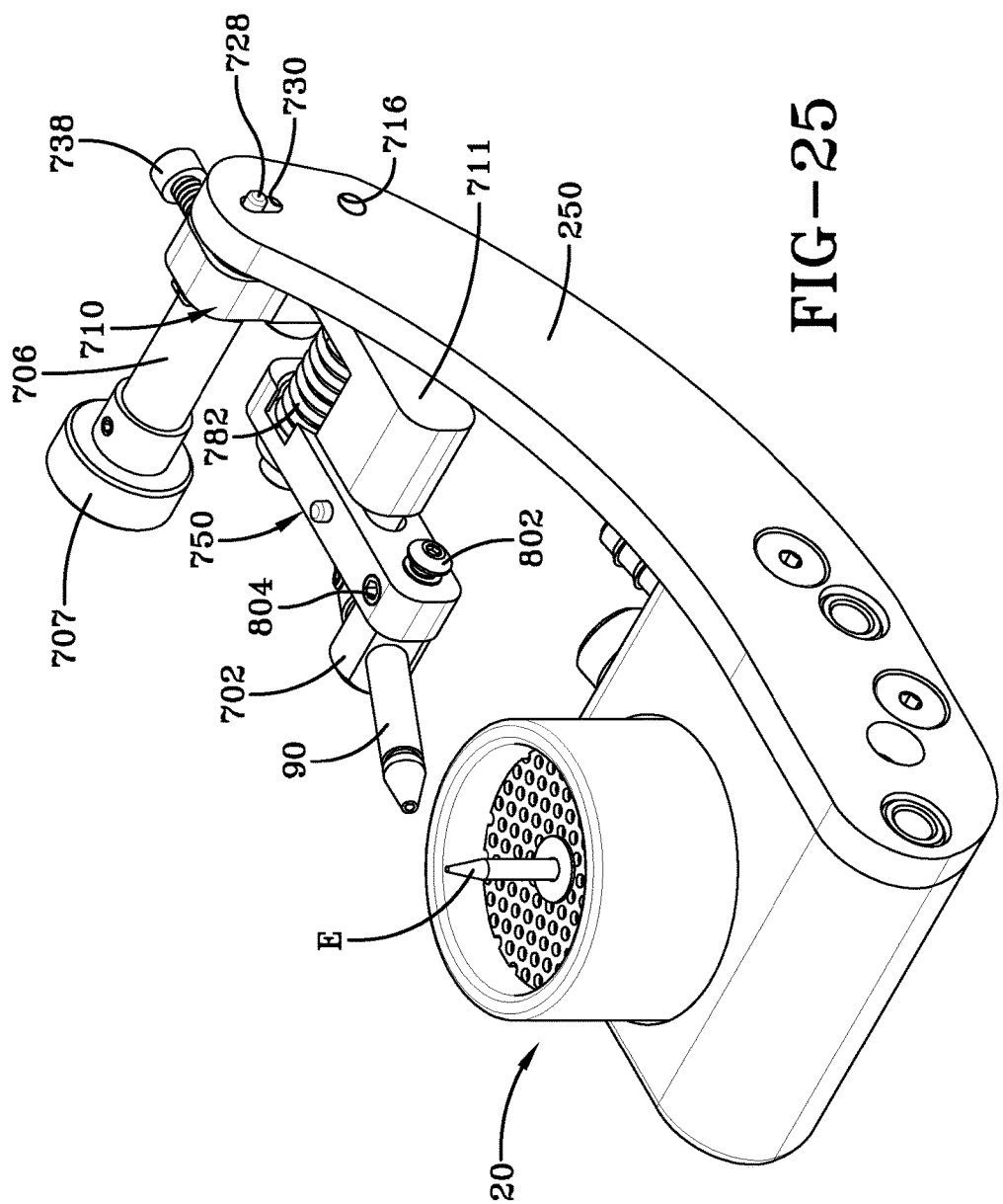

FIG. 25 is a left side bottom perspective thereof.

Figure 26:
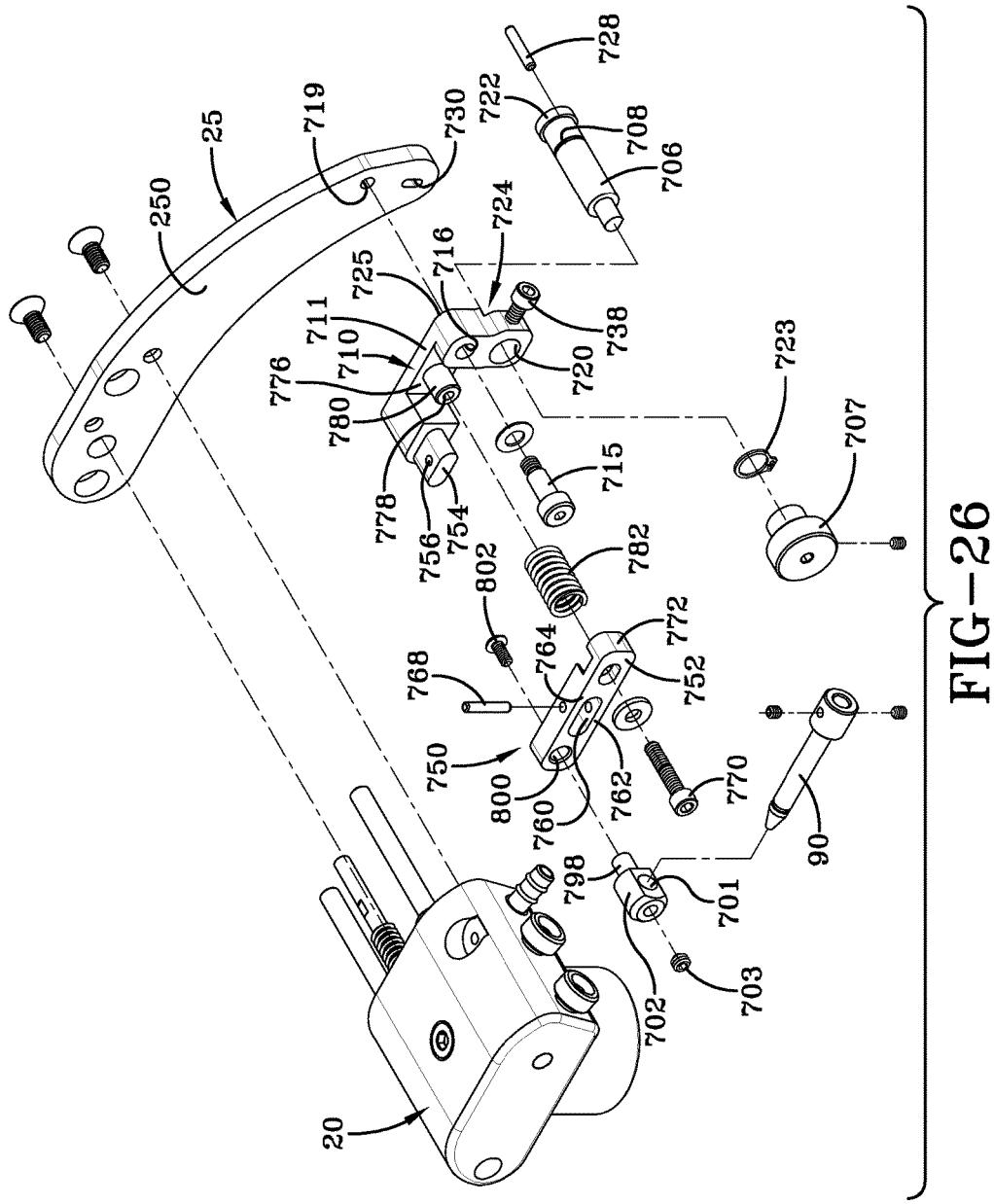
Figure 27:
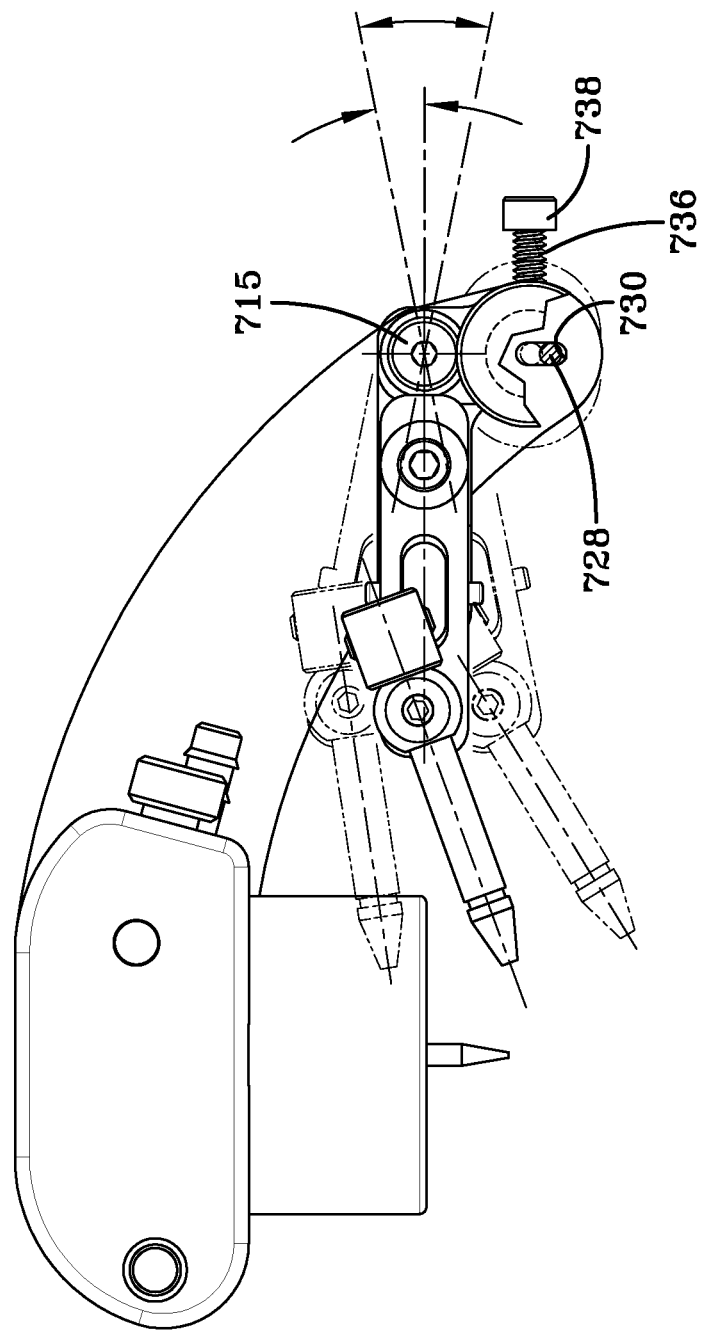

FIG. 26 is an exploded perspective view of the welding torch and wire guide fixture assembly;

FIG. 27 is a side elevational view partially cut away to show details of a height adjustment assembly.

Figure 28:
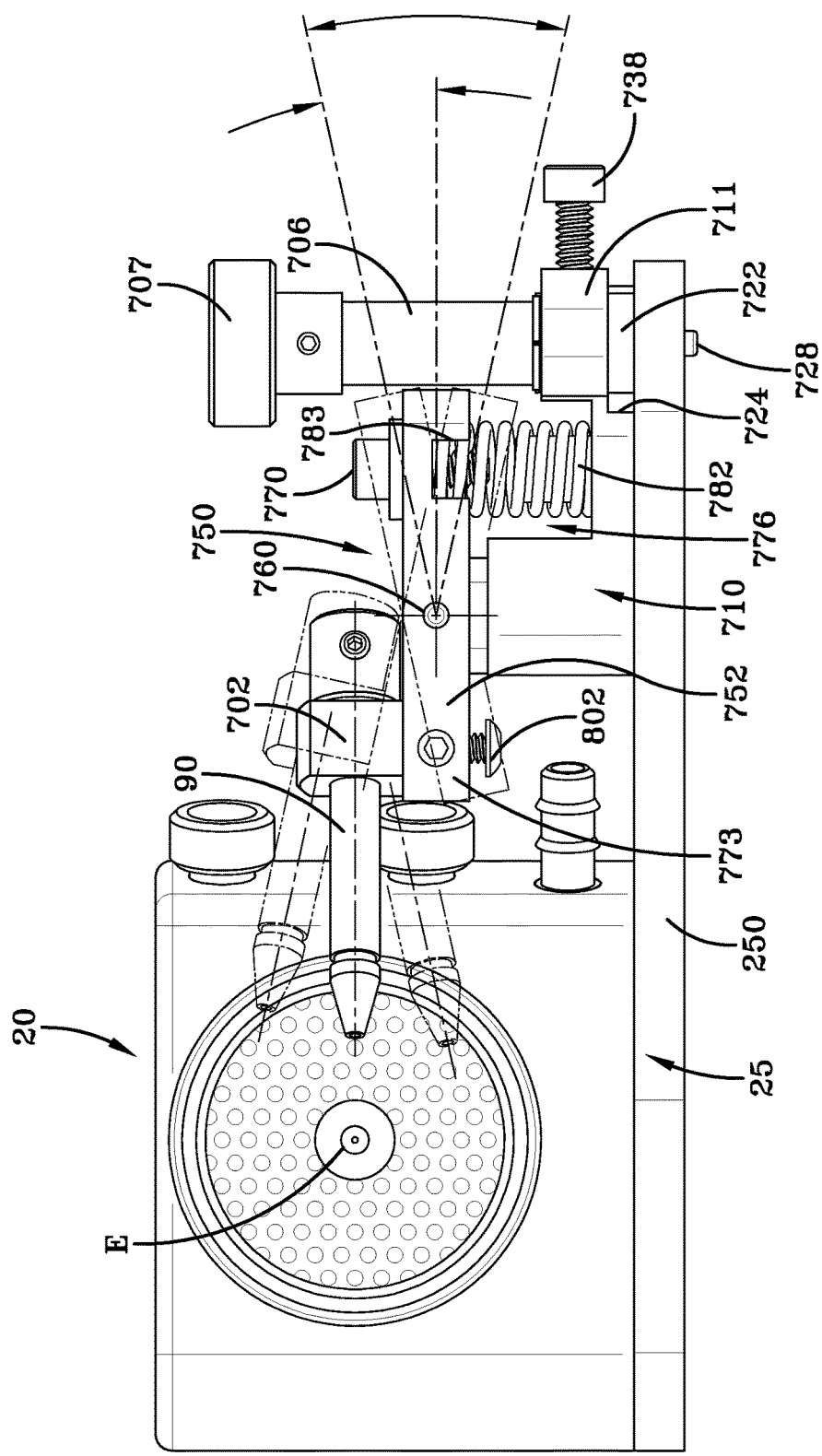

FIG. 28 is a bottom elevational view depicting details of an alignment assembly.

Figure 29:
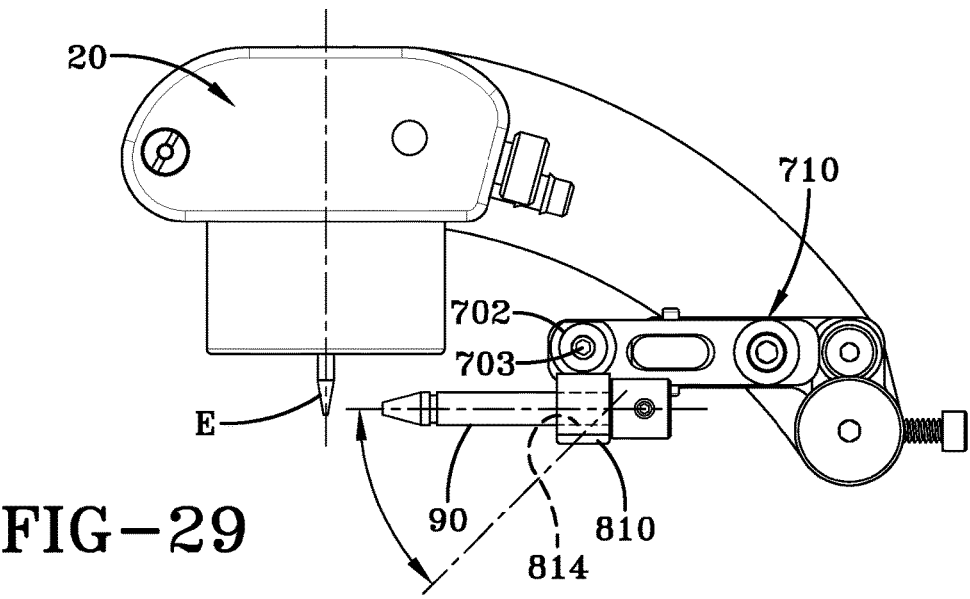

FIG. 29 is a side elevational view depicting a second wire guide holder mounted in a first holder in a first configuration.

Figure 30:
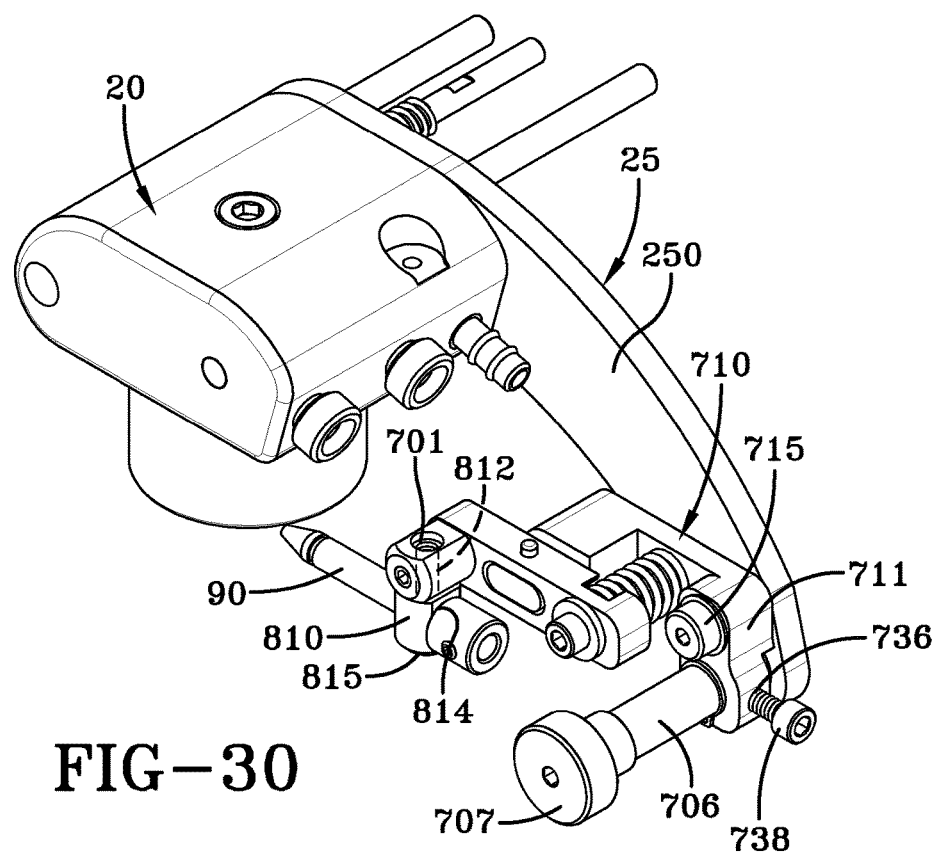

FIG. 30 is a perspective view thereof.

Figure 31:
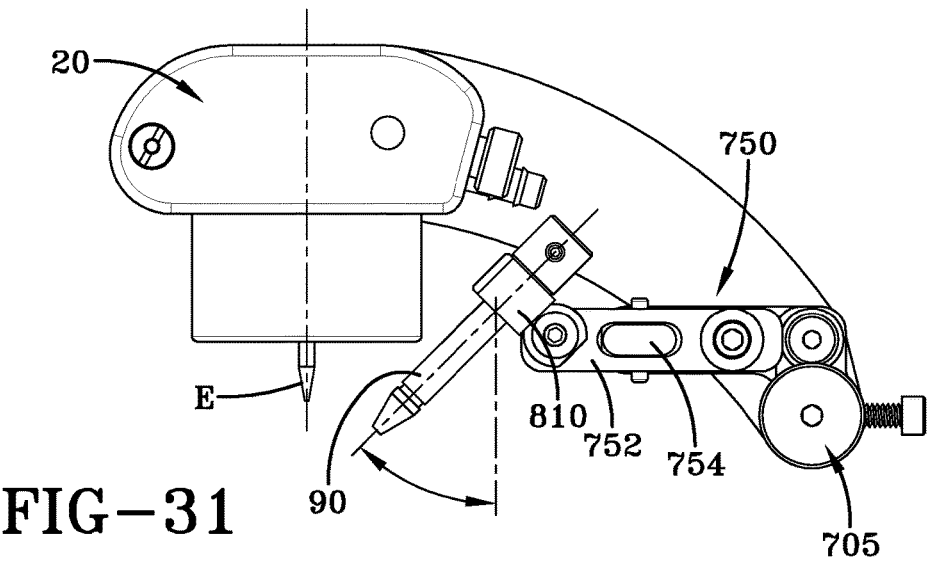

FIG. 31 is a side elevational view similar to FIG. 29 with the second holder in a second configuration.

Figure 32:
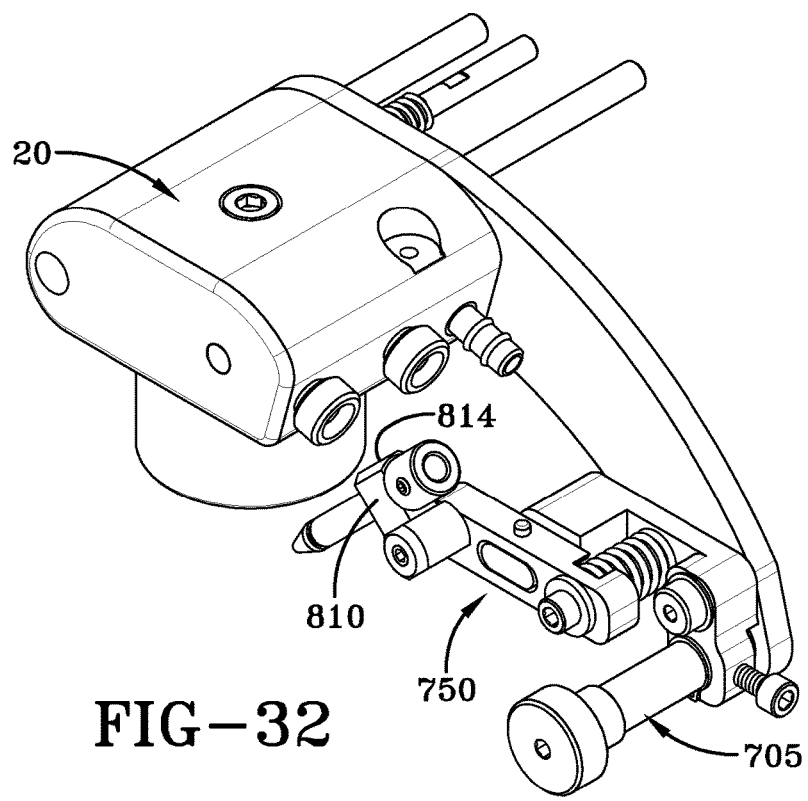

FIG. 32 is a perspective view thereof.

Figure 33:
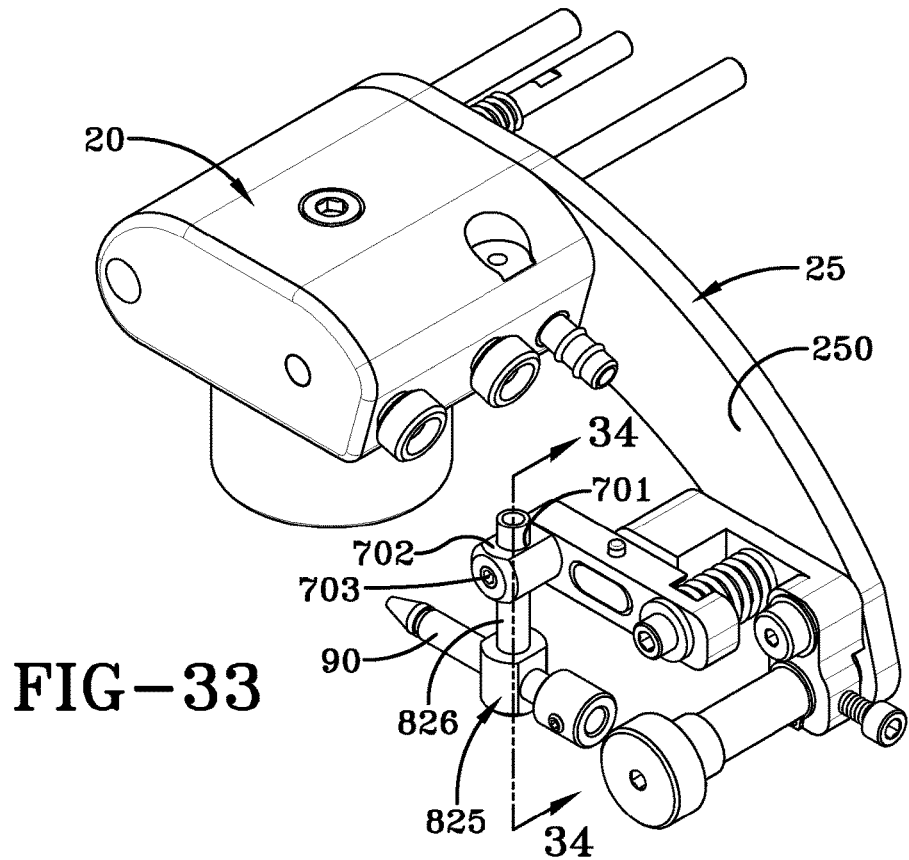

FIG. 33 is a perspective view of an alternative second holder adapted to support the wire guide.

Figure 34:
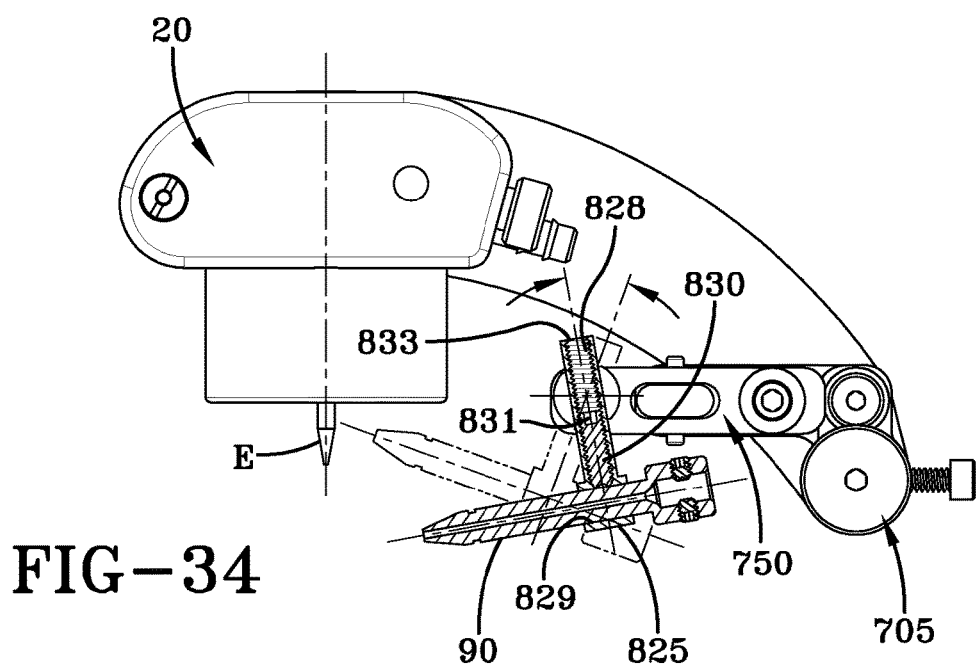

FIG. 34 is a side elevational view thereof with a portion sectioned to show further details of the alternative second holder.

DETAILED DESCRIPTION OF THE INVENTION

Exemplary embodiments of the invention will now be described below by reference to the attached figures. The described exemplary embodiments and embodiments shown in the figures are intended to assist the reader in the understanding of the invention, and are not intended to limit the scope of the invention in anyway. "Welding" or "weld" as used herein including any other formatives of these words will refer to depositing of molten material through the operation of an electric arc including but not limited to submerged arc, GMAW, MAG, MIG, and TIG welding. The particular example shown relates to an orbital welding application using a TIG process. According to the invention, a welding wire alignment system is provided to align the wire guide with the powered electrode. It will be appreciated that the invention could be extended to other welding applications where a consumable wire or rod is used as the electrode. In those instances, the wire alignment system would be used to align the consumable wire or rod relative to the workpiece for consistent application of the weld to the workpiece.

The welding system according to the present invention is generally indicated by the number 10 in drawings. Welding system 10 includes an electrode E that is powered to create an arc between electrode E and a workpiece WP. The area to which the weld is applied includes a molten weld puddle, which may include material deposited by welding system 10 and molten metal from the workpiece WP created by arc penetration. For simplicity, this area will be referred to as a welding zone Z and schematically represented in the drawings. Welding system 10 is an orbital welding system and may be used to form arcuate welds including but not limited to welds used to join adjacent sections of pipe. Welding system 10 generally includes a welding head 15 that includes the primary assemblies of welding system 10 including a torch head 20, which may be held adjacent to the workpiece WP by a clamp assembly, not shown. Other assemblies may optionally be included on welding head 15 including but not limited to wire feeder assembly 80, drive assembly 100, motor housing cooling assembly 175, and torch head cooling assembly 300 as described more completely below.

Figure 1:
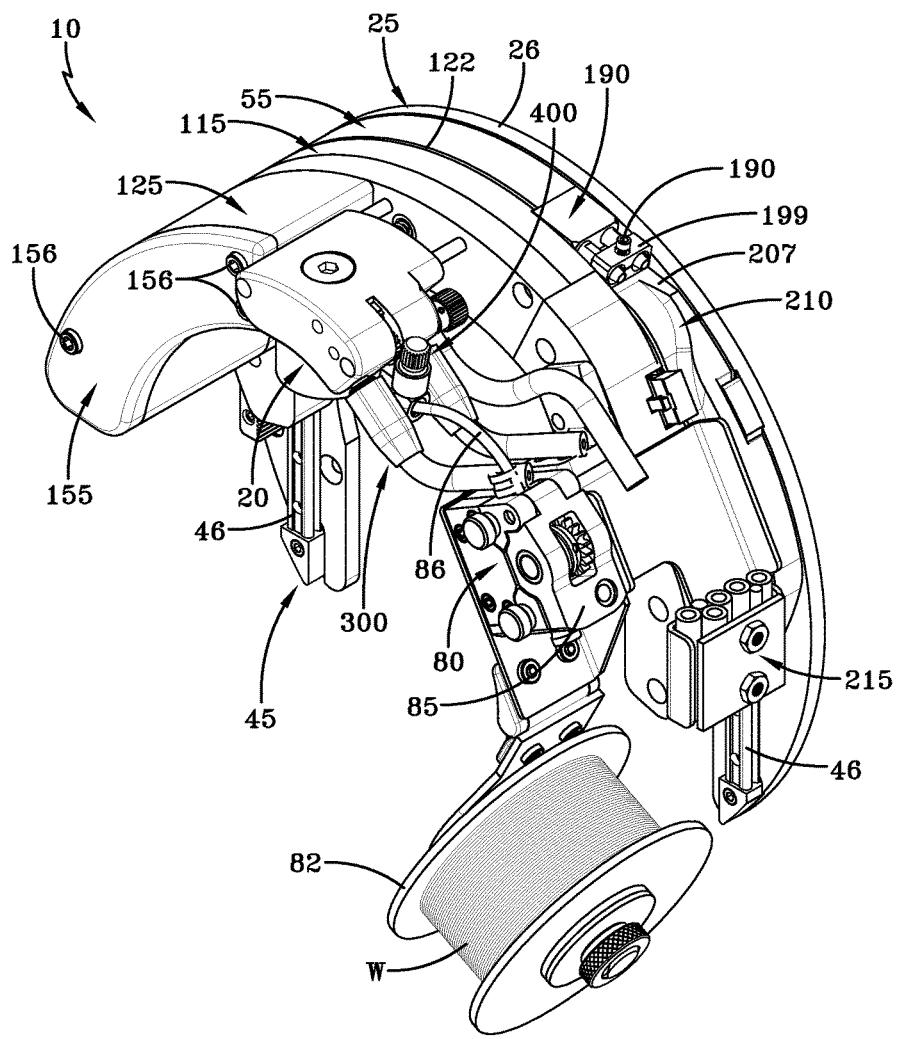
FIG. 1 is a top perspective view of a welding system according to the invention.

With reference to FIG. 1, welding system 10 includes a torch head 20 supported on a generally C-shaped frame 25. As best show in FIG. 4, frame 25 may include a backing plate 26 having a first arm 31 laterally spaced from a second arm 32 and connected by a cross piece 33 defining an opening 35 there between having a mouth 40 opening outward of frame 25 at the outer extremities 37 of arms 31, 32. The example shown is oriented with first arm 31 and second arm 32 extending in a downward direction.

As used herein, spatially orienting terms such as "above," "below," "upper," "lower," "inner," "outer," "right," "left," "vertical," "horizontal," "top," "bottom," "upward," "downward," "laterally," "upstanding," et cetera, can refer to respective positions of aspects as shown in or according to the orientation of the accompanying drawings. "Inward" is intended to be a direction generally toward the center of an object from a point remote to the object, and "outward" is intended to be a direction generally away from an internal point in the object toward a point remote to the object. Such terms are employed for purposes of clarity in describing the drawings, and should not be construed as exclusive, exhaustive, or otherwise limiting with regard to position, orientation, perspective, configuration, and so forth.

A torch height positioning assembly generally indicated by the number 45 may be provided to move the torch head 20 toward and away from workpiece WP, also referred to as adjusting the torch height. Positioning assembly is any assembly capable of moving torch head 20 such that the electrode is moved toward or away from the work piece along a torch height axis TH including but not limited to various linear actuators including mechanical, pneumatic and hydraulic actuators. The depicted example includes a mechanical linear actuator employing a rack and pinion assembly as described more completely below.

Torch height positioning assembly 45 includes a pair of rails 46 supported on backing plate 26. Rails 46 may have end stops 48, 49 to limit the range of motion provided by torch height positioning assembly 45 and enclose the ends of rails 46. Rails 46 generally extend the entire length of first and second arms 31, 32 to maximize the range of motion for the welding head. Although not shown, the end stops 48, 49 may be lockable in plural positions to adjust the range of motions of positioning system 45 or to fix the torch head 20 in a particular position. Alternatively, as shown, a gear rack generally indicated by the number 50 may be provided to adjust and set the position of torch head 20 relative to the workpiece WP.

With reference to FIG. 6, a mounting plate generally indicated by the number 55 may include receivers 56 formed on a rear side 58 to slideable attach the mounting plate 55 to backing plate 26. Receivers 56 may include one or more linear bearings or slide blocks generally indicated at 60 in which the rail(s) 46 is slideably received. To that end, slide blocks may include rolling elements or other surfaces that facilitate linear movement of the mounting plate 55 relative to frame 25. Slide blocks 60 may be housed within a recessed channel 63 formed on an inward surface of mounting block 55. The recessed channel 63 allows a close fit between frame 25 and mounting block 55 reducing the thickness of welding system 10. The reduced thickness of welding system 10 allows welding closer to an obstruction, such as an elbow or flange.

In the example shown, slide blocks 60 are divided into a first slide block 61 and second slide block 62 supported within a recessed channel 63 on mounting plate 55. Each slide block 61, 62 defines a groove or recess in which the rails 46 are slidably received. The recess within first slide block 61 is aligned with the recess in slide block 62, when a single straight rail 46 is used as shown. It is contemplated that offset rails may be provided in some circumstances. First slide block 61 is vertically spaced from second slide block 62 defining a gap 65 between slide blocks 61, 62. A corresponding opening 68 may be formed in the wall of recessed channel 63 to allow a pinion 70 to interact with the rack 50 as discussed more completely below.

In the example shown, rack 50 includes a row of gear teeth 51 facing inward toward opening 35. When assembled with mounting plate 55, rack 50 lies adjacent to gap 65. Pinion 70 is received within opening 68. The teeth on pinion 70 mesh with teeth 51 of rack 50 adjacent to opening 68.

To accommodate the gear rack 50, mounting plate 55 may be provided with a rabbet 66 formed on the rear side of mounting plate 55 adjacent to slide blocks 61 and 62. As shown, rabbet 66 may be formed by a divider 67 extending rearward from mounting plate 55 forming the lateral outward side of channel 63. As shown, since the rack 50 may be located only on one side of backing plate 26, rabbet 66 and the other structures provided to accommodate the rack 50 and pinion 70 may only be provided on one side of mounting plate 55. With continued reference to FIG. 6, divider 67 may be separated into two sections corresponding to the spacing of slider block 61 and 62 such that gap 65 separates first divider section 67A from second divider section 67B. An opening 68 created between first divider section 67A and second divider section 67B also receives pinion 70 allowing it to mesh with gear rack 50. To permit passage of pinion 70 through the front portion of mounting plate 55, a pinion bore may extend from a front side 71 of mounting plate 55 and open on a rear side 58 of mounting plate 55 to communicate with the gap 65 and opening 68.

In the example shown, relative movement between mounting plate 55 and backing plate 26 is used to position the torch head 20 by supporting the torch head 20 and other assemblies on mounting plate 55. The rack and pinion system may be manually actuated to adjust and fix the position of torch head 20. Or as shown, pinion 70 may be driven by a torch height motor 112, described below, to automatically adjust the torch height position during initially set up and throughout the welding process as necessary.

Figure 2:
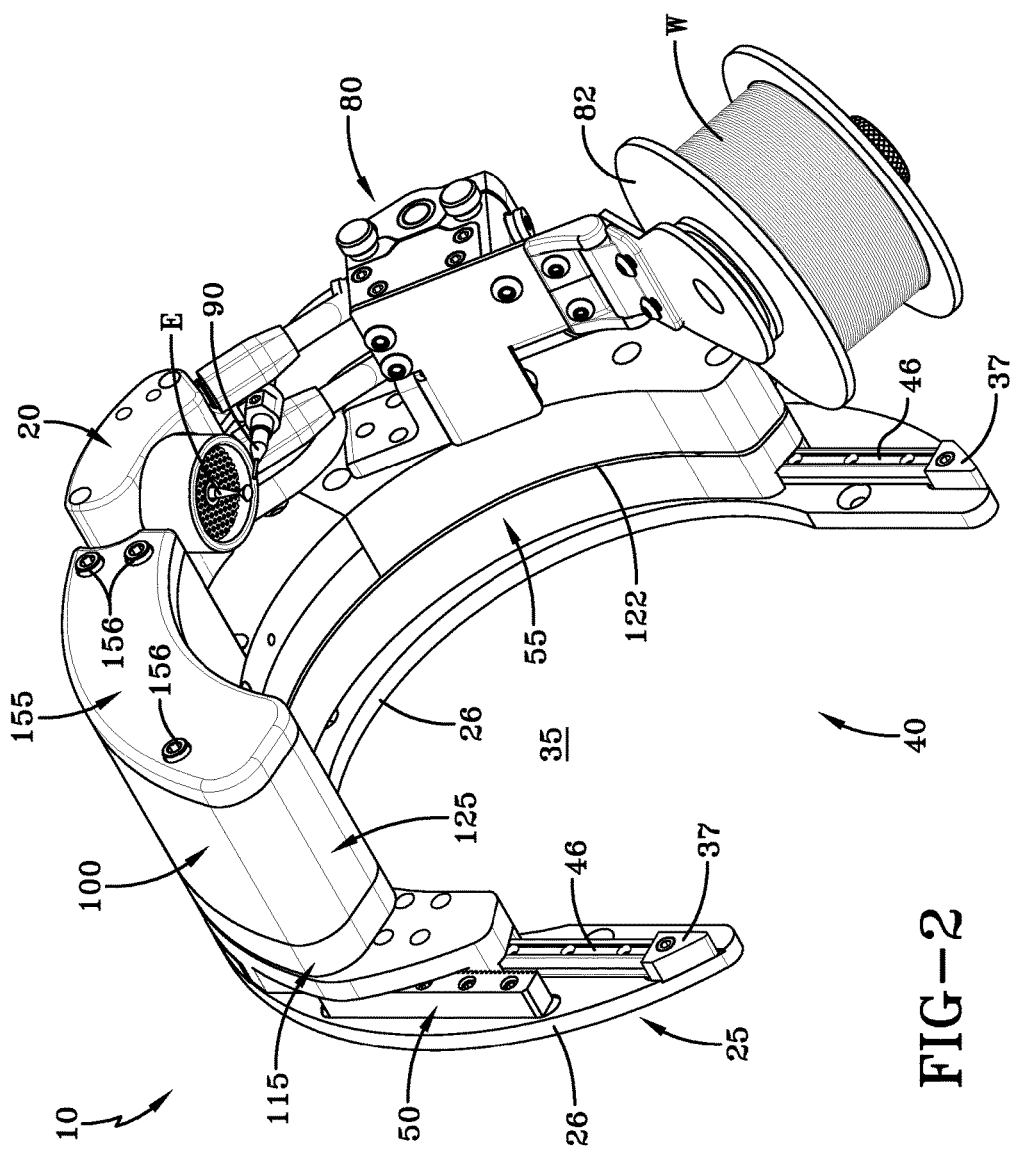
FIG. 2 is a bottom perspective view thereof.

With reference to FIG. 2, in addition to torch head 20, a wire feeder assembly generally indicated by the number 80, may be supported on mounting plate 55. It will be appreciated that not all welding systems according to the invention will require a wire feed assembly, and, therefore, this feature is optional. In the example shown, however, the welding system 10 is an orbital TIG system and includes a wire feeder assembly 80 that provides wire W to the torch head 20 as described more completely below. With reference to FIGS. 1 and 2, wire feeder assembly 80 may include a wire supply, such as a spool 82 and a wire feeder 85 that draws wire W from spool 82 and delivers it adjacent to electrode E via a wire guide 90. As best seen in FIG. 1, wire W may be provided to wire guide 90 through a conduit 86, which, as shown, may be a flexible tube. In the example shown, wire feeder assembly 80 is generally located along first arm 51 of mounting plate 55 and suitable receivers generally indicated at 88 may be provided within first arm 51 to attach to wire feeder assembly 80 or support brackets for the wire feeder assembly 80 thereto.

Figure 4:
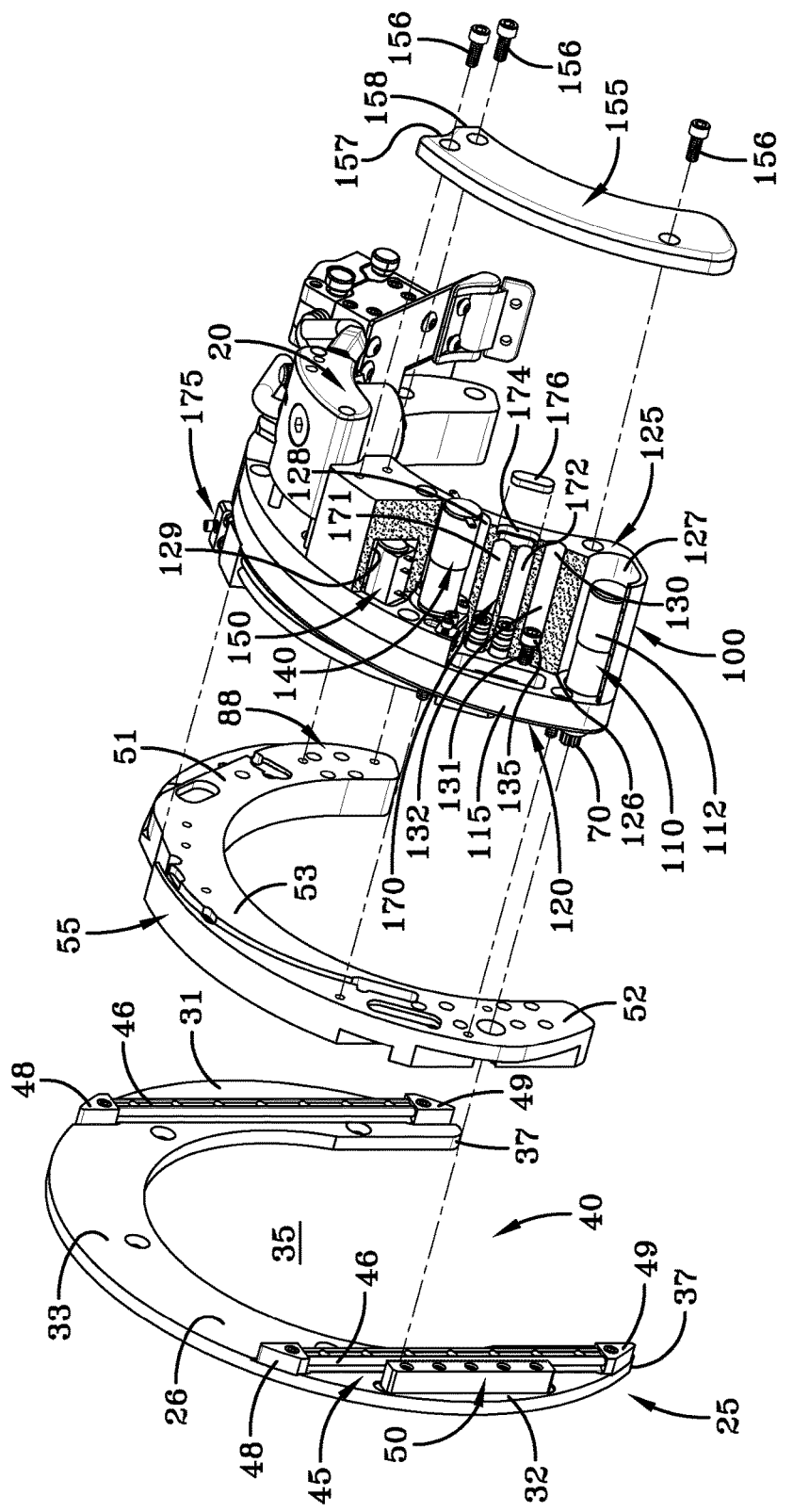
FIG. 4 is an exploded front perspective view.

With reference to FIG. 4, a drive assembly, generally indicated by the number 100, may be located in the area of second arm 52 of mounting plate 55. Torch head 20 is located between wire feeder assembly 80 and drive assembly 100. It will be appreciated that torch head 20 may be located in other positions and the other components, including wire feeder assembly 80 and drive assembly 100 may be in positions other than those shown in the drawings.

With reference to FIG. 4, as mentioned above, the height of the torch head 20 may be adjusted along rails 46 by operation of the rack 50 and pinion 70. This positional adjustment may move electrode E toward or away from the workpiece WP, and will be referred to herein as a torch height adjustment. This adjustment may be performed automatically during the welding process by using a torch height drive assembly, generally indicated by the number 110, that adjusts the torch height based on feedback from a power source. For example, voltage feedback from the power source indicates whether the electrode needs to be moved closer to or away from the workpiece WP.

Torch height drive assembly 110 includes a torch height motor 112 adapted to drive pinion 70. Pinion 70 may be driven directly or indirectly by torch height motor 112. In the example shown, pinion 70 is directly driven by motor 112 by coupling pinion 70 to the shaft of motor 112. As best seen in FIG. 7, a ball bearing 114 may lie over a portion of the drive shaft and pinion 70 to prevent radial loading on the motor shaft. To further isolate the drive assembly 100, plate 115 may be provided between the mounting plate 55 and the drive assembly 100. The insulating plate 115 may be made out of any suitable material to prevent arcing during the welding operation, including, but not limited to, a phenolic material. Receivers are provided in the mounting plate 55 for attaching the insulating plate 115 to the mounting plate 55. Drive assembly 100 generally is attached to mounting plate 55 by fasteners that are received in the insulating plate 115. On occasion, some fasteners may pass through insulating plate 115 and attach to mounting plate 55 directly. In these instances, it may be necessary to provide additional insulators, such as, a phenolic washer or sleeve to isolate these fasteners individually.

A system controller, generally indicated by the number 120, may be connected to a circuit board 122 adjacent to insulating plate 115 or attached on the side of insulating plate opposite drive assembly 100. The circuit board 122 may be printed circuit board provided with one or more connectors. In the example shown, circuit board 122 routes signals from the weld head to system controller 120. According to one aspect of the invention, system controller 120 is in electrical communication with the torch head 20, power supply, and torch height motor 112 to adjust the position of the torch head 20 based on voltage feedback from the power source. Depending on the feedback from power source, system controller 120 may signal torch height motor 112 to rotate clockwise or counter-clockwise to raise or lower the torch head 20 to adjust the position of electrode E relative to the work piece. System controller 120 may be in communication with and/or control other assemblies as will be described more completely below.

With reference to FIG. 4, drive assembly 100 may be housed in a housing, generally indicated by the number 125. Housing 125 may be constructed of any suitable material for housing the drive components, including, but not limited to, metals, plastics, ceramics, or other combinations of materials. Housing may have any configuration including but not limited to a hollow shell or block formed with receivers for individual components, as shown. In the example shown, housing 125 is constructed of aluminum to assist in heat transfer in conjunction with the cooling assembly discussed more completely below. Housing 125 defines one or more receivers in which portions of the drive assembly are housed. For example, a torch height drive receiver 127 is defined within housing 125 to receive the drive motor 112 therein. As shown, torch height drive receiver 127 may be a through bore within housing 125. One or more fastener receivers 130 may be formed in housing 125 to facilitate attachment of housing 125 to an adjacent block, such as, the insulating plate 115 shown. In the example shown, fastener bore 130 includes a counter-sunk bore having a first portion 131 that receives the shaft of the fastener 135 and a larger diameter portion 132 that receives the head of the fastener 135. It will be appreciated that other types of fasteners may be used that cause the configuration of fastener receiver 130 to vary or may remove the need for a fastener bore 130 altogether, as in the case of a weld or adhesive used to attach the block 125 to an adjacent structure or externally mounted fasteners.

In accordance with another aspect of the invention, the torch head 20 may be moved laterally in a controlled manner. Lateral movement is along an axis perpendicular to the path of the torch. In the example shown, the torch head is moved toward and away from mounting plate 55 and may be programmed to oscillate in a pre-defined manner as described more completely below. An oscillation motor, generally indicated at 140, may be provided to separately drive the torch head 20 laterally along an oscillation axis OA. To that end, housing 125 may define a receiver 128 for this motor 140. In the example shown, the oscillation motor 140 has a generally cylindrical housing that extends substantially the entire width of housing 125. To accommodate the oscillator motor 140 shown, an oscillator motor receiver 128 may be formed in housing 125. Oscillator motor receiver 128 may be a through bore within housing 125.

Figure 3:
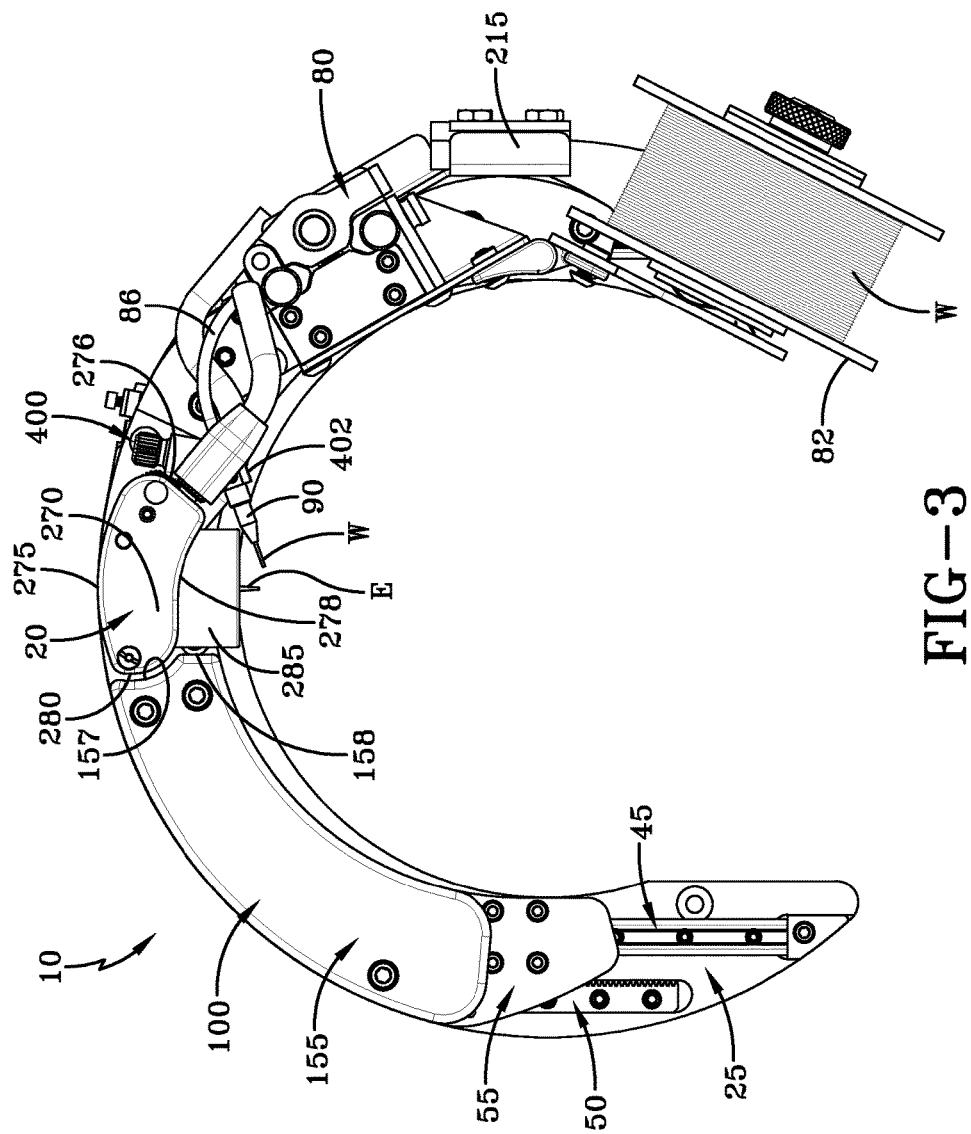
FIG. 3 is a front plan view thereof.

Likewise, a potentiometer receiver 129 may be formed in housing 125 when a potentiometer is used. In the example shown, potentiometer 150 (FIGS. 4 and 8) and a mounting plate 160 for a belt tensioner 162 are located adjacent to each other and extend less than the width of the housing 125. To that end, receiver 129 may include a recess formed in an inward surface 126 of housing 125. The receiver 129 may include a single recess having a varying depth to accommodate both the potentiometer 150 and mounting plate 160 for the belt tensioner 162. Alternatively, separate receivers may be formed for each part. As needed, additional receivers may be formed within housing 125 to accommodate additional structures therein. Also, as will be discussed more completely below, coolant passage 170 may be formed in housing 125 for cooling purposes. To enclose the components within housing 125, a cover, generally indicated by the number 155, may be provided and attached with suitable fasteners 156 that may be secured to housing 125, as shown. With reference to FIG. 3, cover 155 may include a notch 157 on an inward end 158 thereof to provide clearance for an end of torch head 20.

In accordance with another aspect of the invention, a housing cooling assembly, generally indicated by the number 175, is provided to cool the motor housing. It will be understood that housing may house components other than the motor including but not limited to a drive train or electronics. To that end, a coolant passage, generally indicated at 170, may be provided within the motor housing to circulate a coolant through the housing. The example shown, the housing for the drive assembly 100 includes housing 125. Housing 125 defines a first coolant passage 171 and a second coolant passage 172. First and second coolant passage 171, 172 may be cylindrical bores defined in housing 125, as shown and connected at their axial outer extremity by a machined recess 174 within housing 125. It will be appreciated that other passages or connectors may be used to provide fluid communication between first passage 171 and second passage 172. A cap 176 is provided to seal recess 174 and enclose passages 171, 172.

Coolant assembly 175 may further include a coolant lines, such as supply line 177 and return line 178 connected to a connector generally indicated at 180 that circulates coolant through coolant passage 170. In the example shown, connector 180 is provided with a first connection 181 and a second connection 182 respectively received within first passage 171 and second passage 172. As best shown in FIG. 6, first and second connectors 181, 182 may have a cylindrical shape and define an annular recess 183 for receiving a sealing member 184 such as an O-ring.

As shown, coolant line is 177, 178 and connector 180 may be located inward of insulator plate 115. Insulator plate 115 may be provided with a receiver, generally located as 185 that allows connectors 181, 182 to be inserted through insulating plate 115 to extend into passages 171, 172 as shown in FIG. 4. It will be appreciated that tabs or other connections may extend outwardly from passages 171, 172 to attach to a female-style connector 180 as well. In the example shown, coolant receiver 185 in insulation plate 115 has a generally rectangular shape and is sized to receive a portion of the connector housing 186 as shown in FIG. 7. Connector housing 186 may have any shape and may, as shown, be used to change the direction of the coolant flow and connect coolant lines 177, 178 to connectors 181, 182. For example, as best seen in FIG. 6, taps 187, 188 may extend upwardly from one side 189 of connector while connectors 181 and 182 extend from a second side at a right angle relative to taps 187, 188. Alternatively, recesses may be formed in the side 189 or connector housing 186 to receive the ends of coolant lines 177 and 178 to the same effect.

Coolant lines 177, 178 may be constructed of any suitable material for conveying the coolant with attention to the temperatures of the coolant being circulated and the external temperature conditions experienced during the welling operation. The coolant lines 177, 178 may be constructed of metal, plastic, and other material may be used to convey coolant including but not limited to thermal potted copper tubing, as shown. Routing the coolant lines 177, 178 on the inward side of insulating plate 115 helps thermally isolate the coolant lines from torch head 20 and also electrically isolate them.

A second connector, generally indicated by the number 190, may be provided to connect the coolant lines 177, 178 to a suitable coolant supply. It will be appreciated that the return line 178 may be routed to a heat exchanger such that the coolant is simply re-circulated after conditioning. Connector 190 includes a housing 191, which may be of any shape including the rectangular box-like shape shown. Housing 191 includes a pair of fittings 193, 194 that connect to the coolant supply lines extending from the coolant supply. Fittings 193, 194 are arranged parallel to each other. Coolant lines 177, 178 are fluidly connected with fittings 193 and 194 within connector 190. A clamp assembly 195 may be provided to help secure the supply and return lines that attach to fittings 193, 194. For example, as shown, clamp 195 may include two clamp halves 196, 197 defining semi-circular recesses that face each other for receiving the lines. A fastener 199 extends downwardly through both halves, 196, 197 and may be tightened to apply a clamping force to the lines.

During operation of the system, a coolant fluid, which may be liquid or gas, is introduced through supply line 177 and circulated through passage 170 within housing 125. In the example shown, water is used as a coolant. After circulation through passage 170 the coolant exits via return line 178. Circulation of coolant through passage 170 cools a drive assembly 110 by conducting heat away from the electronics including the motors 112 and 140 and potentiometer 150 through housing 125. Preventing over-heating of these components reduces the likelihood of component failure and the potential downtime associated with repair or replacement of the components. An additional benefit of the cooling is that the housing 125 temperature is reduced reducing the likelihood that the operator would be burned through contact with the housing 125 or other portion of the drive assembly housing.

With reference to FIG. 5, mounting plate 55 made be provided with a coolant assembly receiver generally indicated by the number 200. Coolant receiver 200 generally includes a recess or other open area defined within mounting plate 55 to enclose at least a portion of coolant assembly 175. In the example shown, coolant receiver 200 includes a recess 201 that receives first connector 180, and an elongated coolant line recess 202 that receives the coolant lines 177, 178, and opens externally of the mounting plate 55 at opening 204. A land 205 is located adjacent to opening 204 and recessed from the upper surface 206 of mounting plate 55 to provide a surface of which second connector 190 may rest. Adjacent to land 205 is a clamp land 207 that may be angled slightly upward to tilt the fittings 193, 194, and clamp assembly 195 upward facilitating access thereto, as best shown in FIG. 1. Also shown in FIG. 1, an upstanding guide 210 may be provided to route the coolant lines extending from clamp assembly 195 to a conduit bracket generally indicated at 215 as used to consolidate and route the various conduits away from the welding head.

As discussed, conduit bracket 215 can receive extensions from coolant lines (e.g., 177, 178) associated with coolant assembly 175. Conduit bracket can also receive other coolant lines (e.g., 307, 308) described elsewhere herein. By routing various coolant lines along wire feeder assembly 80, a wire feed motor of wire feeder assembly 80 can be cooled. For example, coolant lines 307, 308 can pass over or along a first face of wire feeder assembly 80, and/or extensions of coolant lines 177, 178 projecting from connector 190 can be routed along a second face of wire feeder assembly 80 to reduce a risk of overheating at least in a wire feed motor.

As shown in FIG. 5, coolant receiver 200 may include a recess 201 (or other opening) adapted to receive the first connector 180 in a location aligned with receiver 185 such that when the mounting plate 155 and insulating 115 are attached to each other, connector 180 is housed within the respective receiver 185 and recess 201. Coolant receiver 200 also includes a slot-like coolant line recess 202 extending in an arc upward from connector recess 201 toward opening 204. As best shown in FIG. 1, the coolant line recess 202 has a depth sufficient to receive lines 177, 178 completely therein such that when the mounting plate 55 and insulating plate 115 are assembled, the coolant lines 177, 178 are enclosed.

Additional recesses including recesses 212, 213 and 214 may be provided in mounting plate 55 to receive connectors 216, 217 and 218 (FIG. 6) on circuit board 122. It will be appreciated that additional receivers including threaded fastener receiver generally indicated that 210 may be provided on mounting plate 55 to facilitate attachment of the welding head to the mounting plate 55.

Circuit board 122 may be electrically connected to the drive motors and sensors in the system to route signals to system controller 120. In the example shown, connector 216 is connected to potentiometer 150 to provide torch head oscillation position feedback. Connector 218 is connected to the wire feeder 85. Signals from connectors 216, 218 are routed via circuit board 122 to connector 217, which, in turn, communicates signals to/from system controller 120. Control signals from system controller 120 may be routed from connector 217 to various components in welding system 10 including but not limited to wire feed assembly 80, torch height motor 112, and drive motor 140.

Turning to FIG. 8, further details of the lateral or oscillator drive assembly generally indicated that the number 225 are shown. Torch head 20 may be moved laterally when performing orbital welding. Oscillator drive assembly 225 is provided to automatically move torch head 20 laterally. Drive assembly 225 generally includes motor 140 which is connected to an actuator, generally indicated by the number 230. Actuator assembly 230 may include any actuator that moves torch head 20. In accordance with one aspect of the invention, actuator assembly 230 includes a screw actuation, such as, a ball screw or lead screw actuator. The use of a screw actuator is believed to reduce or eliminate oscillation drift because of the positive connection between the torch head and actuator created by their threaded engagement. In the example shown, a lead screw actuator is used and includes a lead screw 231 rotatably supported on torch head mounting plate 250. The lead screw 231 extends axially outward from torch head mounting plate 250 to engage torch head 20 and cause lateral movement of torch head 20 upon rotation of lead screw 231 as described more completely below.

With reference to FIG. 15, actuator assembly 230 may also include a screw nut, which, as shown, may be a lead screw nut 232. Lead Screw nut 232 may be press fit into a bore defined in torch head 20. The lead screw nut 232 has internal threads that correspond to the external thread on lead screw 231. The pitch of these threads determines the rate of lateral movement caused by rotation of lead screw 231. As an alternative to using a screw nut, the bore 233 defined within torch head 20 may be tapped to provide the necessary internal thread for the screw actuator.

Within torch head mounting plate 250, lead screw 231 may be supported in a suitable bearing generally indicated at 235 including but not limited to the ball bearing journal 236 shown. Bearing 235 may be press fit into a bore 237 defined in torch head mounting plate 250. The end of lead screw 231 within bearing 235 is freely rotatable to drive the torch head 20 in the lateral direction. In the example shown, drive motor 140 rotates in one direction to move torch head 20 laterally outward relative to torch head mounting plate 250 and rotates in the opposite direction to return the torch head 20 toward torch head mounting plate 250. The motor assembly may provide continuous forward and backward rotation in a cyclical fashion to oscillate the torch head 20 through a desired range of motion referred to as a stroke. The stroke is determined by the length of the lead screw 231 and may be set within any desired range. In the example shown, the maximum stroke for the torch head 20 is 1.25 inches. Feedback regarding the motion of the torch head along axis OA may be provided to system controller 120 as discussed below.

Actuator assembly 230 may be directly connected to a drive motor, or, as shown, motor 140 may be located remotely from actuator assembly 230 and connected by drive coupler, generally indicated at 240, as shown. Drive coupler 240 may be any system for mechanically connecting motor 140 to actuator assembly 230 including but not limited to linkages, gear sets, or a belt system as shown. In the example shown, drive coupler 240 includes a first cog 241 associated with drive motor 140. It will be appreciated that drive motor 140 may have an internal gear box associated with it as well. First cog 241 is rotationally connected as by a key or other mechanisms such that cog 241 rotates with a drive shaft 141 extending from drive motor 140. A second cog 242 is attached to lead screw 231. A toothed belt 245 fits over first cog 241 and second cog 242 to connect the motor 140 to lead screw 231. The teeth on belt 245 are not shown in the figure, but any number of teeth may be used and suitable timing belts are commercially available to engage cogs 241, 242.

Optionally, as shown, welding system 10 may include a potentiometer 150 to provide feedback regarding the lateral position of torch head 20. An encoder may also be used in place of the potentiometer in the system shown. Potentiometer 150 has a third cog 243 mounted on its shaft 153 to sense lateral movement of torch head 20 proportionately from the rotation of screw 231 as indicated through movement of belt 245. To that end, third cog 243 is interposed between first cog 241 and second cog 242 and the belt 245 routed over it so that it rotates with the rotation of drive motor 140. The rotation of third cog 243 generates a signal at potentiometer 150, which in the example shown is between 0 and 10 kΩ. This range corresponds to the stroke of the torch head 20. Therefore, the torch head 20 is located in a centered position relative to the overall when the potentiometer provides a 5 kΩ signal. The center position may correspond to the center of the joint being welded such that the complete stroke (0-10 kΩ) represents one half of the stroke on one side of the joint and the other half of the stroke on the opposite side of the joint allowing oscillation of the torch head in a pattern that equally spans the joint on the workpiece WP. For example, a root pass weld may be formed by oscillating the torch head 20 across the joint. Other patterns may be formed by oscillation of the torch head 20 on axis OA and relative rotation between the torch head and workpiece WP. Manual input from an operator or automatic input from system controller 120 may be used to "steer" the oscillation of torch head 20. For example, the center point, which as discussed may correspond to the joint on the workpiece WP, may be reset left or right of its first position to move the oscillation left or right. Alternatively, other points of reference may be used to make relative movement of torch head 20 for purposes of steering the weld. For example the outer extremes of the stroke may be reset to steer the weld as well. In the example shown, these extremes would be seen by the potentiometer as the 0 kΩ and 10 kΩ signals.

Third cog 243 may be sized to create a defined relationship between one rotation of motor drive shaft 141 and potentiometer shaft 153. For example, third cog 243 may be twice the diameter of first cog 241 to establish a two to one relationship between the rotation of the potentiometer shaft 153 relative to drive shaft 141. Thus, in the example shown, for each complete rotation of drive shaft 141, potentiometer shaft 153 makes a half of a rotation. It will be appreciated that other relationships may be provided including a one to one relationship or relationships greater than or less than a one to one relationship as needed.

As a further option, to maintain tension on the belt as it extends between the first cog 243 and second cog 242, a belt tensioner 162 may be provided. Belt tensioner 162 may include an idler wheel 164 rotatably mounted on a hub 165.

As best shown in FIG. 8, hub 165 may be supported on a fastener 166 extending through mounting plate 160. Mounting plate 160 may define a slotted opening 167 that is oriented to allow vertical adjustment of the position of the tension 161. As best shown in FIG. 9, oscillator drive assembly 225 may be partially housed within a torch head mounting plate, generally indicated by the number 250. Torch head mounting plate 250 may define a receiver generally indicated by the number 252 (FIG. 7) that at least partially houses the drive coupler 240; cogs 241, 242, and 243; and idler 164. Receiver 252 may be a recess formed in torch head mounting plate 250 on an inward surface 251 thereof to accommodate vertical movement of idler 164, receiver 252 may include a notch 254 over idler 164 to provide additional clearance for such vertical movement. A corresponding receiver is formed on insulating plate 115 to enclose the portions of oscillator drive assembly 225 extending beyond the inward surface 251 of torch head mounting plate 250.

In accordance with another aspect of the invention, torch head mounting plate 250 may support a torch guide assembly generally indicated by the number 260. Guide assembly 260 may include one or more guide members, such as, a first guide rod 261 and a second guide rod 262 that extend through torch head mounting plate 250 and parallel to lead screw 231. Guide rods 261, 262 may have any shape including but not limited to the cylindrical shape shown. Guide rods 261, 262 may be constructed of any suitable material that is capable of supporting torch head 20 and withstands the temperature conditions surrounding the torch head 20. For example, aluminum with a ceramic coating or a stainless steel may be used. In the example shown, the guide rods 261, 262 are made from stainless steel. One or more of the guide rods 261, 262 may be used to provide voltage feedback from the torch head 20. To that end, the ends 263, 264 or guide rods 261, 262 may extend through the insulating plate 115 to contact conductive pads 265 on circuit board 122 of system controller 120 to provide the voltage feedback. As discussed above, voltage feedback from conductive pads 265 may be routed by circuit board 122 to connector 217, which sends the voltage feedback to system controller 120.

With reference to FIGS. 9 and 10, to accommodate the actuator assembly 230, torch head 20 generally includes a torch body 270 that may be constructed of a variety of materials including metals and ceramics. In the example shown, power is applied to the torch body 270 directly such that the torch body 270, and therefore, torch body 270 is constructed of a conductive material such as cooper, aluminum, or brass. In the particular example shown, brass has been used. Torch body 270 may define guide bores 271, 272 that respectively receive guide rods 261, 262. In addition, an actuator bore 274 is provided to receive the lead screw nut 233 as discussed above.

Torch body 270 may have any shape including block-like forms and the like. In the example shown, torch body 270 generally has a wedge shape to improve radial clearance. Torch body 270 is thicker on a first side 276 to permit cooling connections to the torch head 20 as will be discussed more completely below. From first side 276, the lower surface 278 of torch body 270 extends upward toward second side 280 to reduce the height of the torch body 270 on that side 280. The recessed area generally indicated at 282 formed by lower surface 278 provides clearance for a shielding cup, generally indicated by the number 285, and the electrode E mounted therein. This compact arrangement further improves the radial clearance for the torch head 20.

In accordance with another aspect of the invention, a torch head cooling assembly, generally indicated by the number 300 is provided. Torch head cooling assembly 300 includes a torch cooling passage 305 defined within the torch body 270. Torch cooling passage 305 generally includes an inlet passage 301 and an outlet passage 302 that connect to corresponding inlet and outlet cooling lines 307, 308. A connecting passage 304 bridges the inlet passage 301 and outlet passage 302 to allow continuous circulation through torch body 270. In the example shown, the passage 305 is formed by boring inlet passage 301 and outlet passage 302 at an upward angle extending into torch body 270 from first side 276. To make the torch body 270 as compact as possible, these passages 301, 302 may be aligned with each other and lie in the same plane. Likewise, connecting passage 304 maybe formed by boring into the torch body 270 from an interior surface 277 of torch body 270 along an axis parallel to oscillation axis OA and lie within the plane defined by the passages 301, 302. As shown, passage 304 intersects the inner extremities of passages 301, 302 to create fluid communication there between and generally forms a u-shaped cooling passage 305. To close passage 304 inward of outlet passage 302, a plug may be inserted into the portion of the bore extending inward thereof.

As best seen in FIGS. 12 and 13, the bores forming inlet and outlet passages 301, 302 may be counter sunk to receive a fitting 320 to which fluid lines 307, 308 attach. Given the proximity of the lines 307, 308 to torch head 20, protective caps 311, 312 may be provided to cover the fitting 320 and lines 307, 308 at their ends. From protective caps 311, 312, fluid lines 307, 308 may be routed back to bracket 215 and from there to a suitable coolant supply. In the example shown, the torch head is cooled by water.

The torch head 20 shown may be provided with a gas shielding assembly generally indicated by the number 325 in FIG. 14. Gas shielding assembly includes a gas supply line 326 that may be routed to bracket 215 and from there to a suitable gas supply. Gas supply may include a pressurized cylinder or non-pressurized source connected to a pump. The gas supplied is generally an inert gas, such as, argon. This example, is not limiting as it is known to use other types of gas to provide shielding during welding. Shielding gas assembly 325 further includes a gas passage generally indicated by the number 330 that is defined within torch body 270. Gas passage 330 fluidly connects the gas supply line 326 to a shield gas outlet 332 formed in torch body 270. The gas outlet 332 communicates with the electrode assembly 350 (FIG. 17). Briefly, shield gas exists torch body 270 at the outlet 332 and is channeled through the electrode assembly 350 to direct shielding gas toward the electrode and the welding zone Z. Returning to FIG. 14, passage through 30 may have any configuration including the generally L-configuration shown. In the embodiment shown, a gas inlet passage 331 extends downward and toward first side 276 of torch body 270 gas inlet passage 331 may be counter sunk at 333 to receive a quick connect fitting 335. The example quick connect fitting has a pair of frusto-conical rings that expand outward toward the inlet passage 331 allowing the line 326 to be press fit onto the quick connect 335. Torch body 270 may be recessed relative to first side 276 at 336 to provide clearance for the quick connect 335 and a vertical high adjustment mechanism, described more completely below. Gas passage 330 may further include a connecting passage 337 that extends from inlet passage 331 across torch body 270 along a line parallel to axis OA which may be formed by boring into the torch body from the inward side 277 thereof. Again, any portion of the bore forming passage 337 extending beyond inlet passage 331 may be plugged to close this passage from the atmosphere.

As best shown in FIG. 17, shield gas S is directed from outlet 332 into the electrode assembly 350. Electrode assembly 350 may be commercially available electrode assembly including, for example, the Gas Saver™ electrode assembly provided by CK Worldwide. In general, electrode assembly 350 includes a collet body 352 that includes a neck portion 354 that extends upwardly to gas outlet 332 and defines a central bore through which shielding gas S is received. Collet body 352 also includes a center portion generally indicated at 355 that has a disk-like body 356 that extends radially outward from neck portion 354 and includes a central flange 357 and an upper flange 358 that are spaced from each other to receive a sealing member 360 such as a silicon O-ring, as shown. A lower flange 359 may be spaced downward from central flange 357 to define an annular recess about the collet body 355. A shielding gas manifold may be formed within collet body 355 at 362 and includes a hollow gas outlets 364 that extend radially outward from the hollow interior 362 and into the annular space defined between flanges 357 and 359. A tungsten adapter generally indicated at 365 may be attached to a lower portion of collet body 355 and include a diffuser plate 366. The diffuser plate 366 may include a pair of perforated tungsten plates sandwiching a central screen. A Pyrex® shielding cup may be pressed fit onto sealing member 360 and surround the collet body 355 and diffuser plate 366. Gas exiting the manifold 362 passing through the diffuser plate 366 and is channeled toward the electrode E and welding zone Z by shielding cup 285.

With continued reference to FIG. 17, torch body 270 made to find a counter sunk bore 375 extending downward from the top surface 275 of torch body 270. A wedge collet 376 may be used to hold the electrode within the central bore formed in the collet body where a portion of the wedge collet 376 and electrode E extend upward into the bored 375. The lower portion 377 of counter sunk bore 375 may be threaded to receive a cap screw 380 (FIG. 12) therein to close the bore and secure the electrode E.

In accordance with another aspect of the invention, a compact wire fixture generally assembly indicated by the number 400 is embedded in torch head 20 as best shown in FIG. 15-20. Wire fixture assembly 400 generally includes a wire height adjustment assembly generally indicated by the number 405 and may optionally also include a wire alignment assembly generally indicated at 402 to which the wire guide 90 is attached. The vertical position of the wire guide 90 may be manipulated by operation of a height adjustment assembly generally indicated by the number 405. As best shown in FIGS. 15 and 16, wire height adjustment assembly 405 may include a gear rack 406 that is actuated by a pinion gear 408 supported on shaft 410, which may be rotated by an easily graspable member such as a spade head, knurled head, or knob 412, shown, that is pinned to the shaft and located within the recessed portion 336 of torch body 270 above shielding gas line 326.

As best shown in FIG. 14, torch body defines a central slot 415 that extends vertically through torch body 270 between cooling inlet passage 302 and connector 304. The slot 415 is formed in a first side 276 of torch body 270 and extend inward from first side 276. This vertical slot 415 accommodates both the rack 406 and pinion 408 housing them within torch body 270. Pinion shaft 410 is journaled within a bore 420. Bore 420 may be counter sunk at its outward end 422 to receive a circular wheel 424 that may be mounted on a noncircular pinion shaft 410. The pinion shaft 410 may further include a cylindrical sleeve 426 that may be journaled within the narrow portion 421 of bore 420. The wheel 424 has a larger diameter than sleeve 426 and may interact with the edge 428 dividing portions 421, 422 to stop axial inward movement of shaft 410, as needed. As best seen in FIG. 15 the pinion gear 408 may be key to the noncircular portion of shaft 410 to rotatably connect the shaft 410 to the pinion gear 408. To fix the height of wire guide 90, a fastener including but not limited to a pin clip, or a set screw 430, as shown, may be used to lock the rack 406. A set screw bore generally indicated at 435 may be provided extending from the front face 279 of torch body 270 inward into the slot 415 to interact with the side wall 407 of gear rack 406. As best shown in FIG. 16, set screw 430 may be an Allen® bolt.

With reference to FIG. 18, gear rack 406 may be connected to bracket 402 by a cross piece 440. Cross piece 440 has a similar width to gear rack 406 and is made to move within slot 415 to preserve the compactness of the wire height adjustment assembly 405. Optionally, to provide further compactness, the upper surface 442 of cross piece 440 may be made concave to provide a recess 443 in which the pinion gear 408 is received (FIG. 20).

In accordance with another aspect of the invention, wire fixture assembly 400 may include a wire alignment assembly 450 to provide further adjustment of the position of the wire W. Wire alignment assembly 450 may be interposed between bracket 402 and height adjustment assembly 405, as shown. As best shown in FIGS. 18 and 19, bracket 402 generally defines a through bore 401 through which the wire guide 90 is inserted and portion of the conduit 86 may be received. A clamp assembly 403 may be provided to secure the wire guide 90 within this bore 401. While bracket 402 may be connected by a solid attachment to vertical height adjustment assembly 405 such that no further positional adjustment of the wire guide 90 may be made other than the height adjustment, further positional adjustment may be provided by attaching bracket 402 to the vertical height adjustment assembly via wire alignment assembly 450. Wire alignment assembly 450 generally is adapted to align wire W with electrode E and may simply provide rotation about a vertical axis. Optionally, as shown, wire alignment assembly 450 provides additional degrees of freedom by way of a ball and socket fixture 451.

The example ball and socket fixture may include a sleeve 452 that is attached to cross piece 440. The sleeve 452 defines a socket 453 including a cylindrical bore 454 which may be counter sunk at an upper portion to form a counter sunk portion 456 having a larger radius than bore 454. Wire alignment assembly further includes a bulb 460 that includes a ball 461 with a neck 462 extending downward from ball 461. The neck 462 may have an external thread, schematically shown at 464 toward the lower end 465 of neck 462 to facilitate attachment of bulb to bracket 402. When assembled, the neck 462 extends through bore 454 and is threaded into a receiver 470 defined in an upwardly extending boss 472 in bracket 402. It will be appreciated that bulb 460 may be attached to bracket 402 in other manners including but not limited to a press fit (FIG. 17), interference fit, pinning, or welding.

As best shown in FIG. 19, boss 472 may have a land 474 that extends upward and inward at an angle relative to bore 401. This land 474, when attached to neck 462 may butt against the lower surface of sleeve 452 to form a preset angle Θ between wire guide 90 and cross piece 42. Neck 462 may, as shown, be considerably smaller than bore 54 allowing free movement of bracket 402 by rotating the ball 461 within the socket 453 formed by sleeve 452. This positioning capability includes rotation about the vertical axis 480 defined by neck 462; tilting from side to side; pitching bracket 402 forward and back; and combinations of these movements. This freedom of movement allows the wire W to be aligned with electrode E and oriented to facilitate the welding process. Once the desired position of the wire guide 90 and wire W is achieved, the selected position may be held by locking ball 461 in place. This may be performed by using a set screw or other known method of fixing a ball and socket. In the example shown, a locking assembly, generally indicated at 485, includes a hat 486 that defines a concave receiver 488 into which an upper portion of ball 461 is received. The outer surface 490 of hat 486 surrounding receiver 488 is sized to fit within the counter sunk portion 456 of sleeve 452 such that the hat 486 may be driven downward to compress the ball 461 in socket 453 to lock it in a selected position. It will be appreciated that a hat 486 may be driven downward to compress the ball 461 and lock it in position in a number of manners including sampling manually squeezing the hat 486 onto ball 461. Alternatively, as shown, outer surface 490 of hat and inner surface 492 of counter sunk portion 456 may include threads 493 that may be used to adjust the height of hat 486 relative to ball 461 by rotation of the hat 486. Corresponding internal threads 494 may be formed on counter sunk portion 456 of sleeve 452. For example rotation in the clockwise direction may drive hat 486 downward to compress the ball 461 within socket 453, and counterclockwise rotation may raise hat 486 to release a compressive force on ball 461. To facilitate this rotation, a head 495 may be affixed to hat 486 that may be more easily grasped then hat 486 and may be sized to provide leverage to the operator. For example, head may include, but is not limited to a spade head, knurled head, wing head, or a knob. Head 495 may be attached to hat 486, or, as shown, hat 486 and head 495 may be formed as an integral part.

As best seen in FIG. 21, wire fixture assembly 400 may be located generally in the same plane as electrode E to globally align wire W with electrode E. Wire fixture assembly 400 may then provide additional fine tuning of the wire position to optimize performance of the torch head 20. As discussed wire fixture assembly 400 is housed largely within the body 270 of torch head 20 and is positioned to hold bracket 402 between torch head inlet and outlet cooling lines 307, 308. By receiving a portion of bracket 402 and angling the wire guide 90 downward, greater radial clearance is provided adjacent to electrode E. Clamp assembly 403 protrudes from cooling lines 307,308 to allow the operator to access clamp assembly 403 and adjust the stick out of wire guide 90 as needed. As referenced above, wire height adjustment assembly 405 may be used to move wire W vertically. Once a selected vertical position is achieved, the height adjustment assembly 405 may be locked in position by a wire height locking assembly, such as a set screw 430 that holds rack 406 against a wall of central slot 415. Similarly, additional adjustment of the wire position may be made with wire alignment assembly 450 including rotation about a vertical axis, pitch, roll, and combinations thereof using the ball and socket joint provided by sleeve 452 and ball 461. Once a selected position is achieved using wire alignment assembly 450, this position may be held by a locking assembly such as a hat 486 that is tightened down on the ball 461 to compress the ball 461 within sleeve 452. It will be appreciated that the wire positioning steps described above may be taken in any order or omitted and are just one method of using the described wire fixture assembly 400.

FIG. 22 shows a welding system 10 as described above mounted on a c-clamp assembly 699 to show one possible application of welding system 10. Like numbers will refer to components described in the previous embodiments. Welding system 10 shown in FIG. 22 includes an alternative wire fixture assembly generally indicated by the number 700. Wire fixture assembly 700 generally includes a wire guide bracket also referred to as a first wire guide holder or first holder 702 that defines a bore 701 through which the wire guide 90 is received. Wire holder 702 may have any shape or configuration suitable for supporting the wire guide. Wire holder 702 may be fixed or made moveable to provide further positioning of wire guide 90, as described below. As discussed above, wire guide 90 defines a passage through which wire is conveyed toward the electrode E. Wire guide 90 may be clamped in the bore 701 by any suitable clamping device including but not limited to the set screw 703 shown. Wire guide bracket 702 is supported on a fixture frame, generally indicated by the number 710. Fixture frame 710 may include a first frame member 711 that is supported on the frame 25 of the welding system 10. In the example shown, the fixture frame 710 is supported on the torch head mounting plate 250. A height adjustment assembly generally indicated by the number 705 is provided to vertically move the first frame member 711 and in turn the wire guide 90, which is attached to the fixture frame 710.

As best shown in FIGS. 23 and 26, fixture frame 710 is pivotally attached to frame 25. Pivotal attachment may be accomplished in a variety of manners including but not limited to a pin or a shoulder screw 714 as shown with reference to FIG. 27. Height adjustment assembly 705 causes vertical movement of wire guide 90 by causing fixture frame 710 to pivot on shoulder screw 715. Pivoting movement of frame 710 may be accomplished in any known manner including but not limited to an adjustment screw or other linear actuator that applies a force to the fixture frame at a point spaced from the pivot or otherwise applies torque to the fixture frame 710. In the example shown, height adjustment includes a shaft 706 that is rotatable within an adjustment bore 720 defined in first frame member 711 and includes a graspable member including but not limited to a spade head, knurled head, a lever, or knob 707 as shown. The shaft 706 extends axially outward from first frame member 711 beyond the fixture frame 710 with the knob 707 located outward of the plane defined by the wire guide 90 to facilitate adjustment without inadvertently bumping the wire guide 90. It will be appreciated that this position is optional and the knob 707 or other graspable member will be located at other positions relative to the fixture frame 710.

In the example shown, first frame member 711 is pivotally mounted on a shoulder screw 715 that extends through a pivot bore 716 in first frame member 711. Shoulder screw 715 may have a threaded end 718 that secures the shoulder screw 715 to a threaded bore 719 in the torch mounting plate 250 of frame 25. An adjustment bore 720 may be defined within first frame member 711 below pivot bore 716. The adjustment bore 720 is of larger diameter than pivot bore 716. The centers of pivot bore 716 and adjustment bore 720 may lie in the same plane as shown in FIG. 27. Shaft 706 may be provided with a boss 722 at its axial inward end having a diameter greater than the bore 720. Boss 722 axially restrains shaft 706 in one direction, a snap ring 723 may fit within a groove 708 on the opposite side of first frame member 711 to axially restrain shaft 706 in the opposite direction.

First frame member 711 may define a recess 724 adapted to receive the boss 722 beneath an upper portion 725 of first frame member 711 that fits flush against the torch mounting plate 250. Recess 724 is sized to permit free rotation of shaft 706 despite the angular position of first frame member 711. A projection, such as a pin 728, extends axially inward from shaft 706 toward frame 25. A vertically extending slot 730 is formed in the frame 25 to receive pin 728 therein. Pin 728 is spaced from the center of the shaft 706. As best shown in FIG. 27, rotation of the shaft 706 causes pin to move within slot 730 and bear against the walls of slot 730 to pivot fixture frame 710 about shoulder screw 715. Height adjustment assembly 705 further includes a height lock assembly generally indicated by the number 735. Height lock assembly includes a lock bore 736 that opens into adjustment bore 720. Lock bore 736 is threaded and receives a height locking fastener 738, such as, a set screw or a socket head cap screw (shown) that is threaded into the lock bore 736 to set the position of shaft 706. Alternatively, lock assembly 735 may include a fastener, clamp or other device that holds the fixture frame 710 against the frame. The frictional engagement of the fixture frame 710 and frame acts to hold the selected position of the fixture frame 710. In the example shown, this may be accomplished by tightening shoulder screw 715 to hold the fixture frame 710 in a desired rotational position. It will be understood that lock assembly holds the desired position of the fixture frame 710, but is not intended to limit the assembly to structures that positively lock the fixture frame against movement initiated by the operator. For example, in the alternative embodiment, the screw 715 may be tightened sufficiently to hold the desired position against movement created by operation of the welding system, yet allow the operator to manually adjust the position of the fixture frame by overcoming the frictional force or clamping force created by screw 715. For example, manual adjustment can be made by rotating shaft 706.

With reference to FIGS. 26 and 28 fixture assembly 700 may optionally include an alignment assembly generally indicated by the number 750 that laterally moves the wire guide 90. Alignment assembly 750 includes an adjustment member 752 pivotally attached along a vertical pivot axis on first frame member 711. In the example shown, first frame member 711 includes a tongue 754 that projects outward from first frame member 711. Tongue 754 defines a pivot bore 756. Adjustment member 752 defines a slot 758 adapted to receive tongue 754 therein. Adjustment member 752 defines a circular opening or recess 760 in a lower wall 762 of slot 758. A circular bore 765 extends through an upper wall 764 of slot 758 and is aligned with recess 760. An adjustment pin 768 extends through circular bore 765, pivot bore 756, and into recess 760 when tongue 754 is received in slot 758 allowing the adjustment member 752 to pivot on pin 768. Slot 758 and tongue 754 may have a similar contour with slot 758 being slightly larger to define a clearance to permit pivoting of adjustment member 752 about tongue 754. Pivoting of adjustment member 752 may be created by an alignment screw 770 extending through a portion of adjustment member 752 spaced outward from pin 768 to apply torque to adjustment member 752. Other linear drivers other than screw 770 shown may be used within the scope of the invention. Screw 770 extends through an alignment bore 774 defined in an end 772 of adjustment member 752 opposite the end of adjustment member 752 supporting wire guide 90 relative to the pivot axis. First frame member 711 defines a recess 776 adjacent to tongue 754 to provide a clearance for pivoting of the adjustment member 752. A threaded receiver 778 is provided to receive alignment screw 770 and may be formed in a wall of the recess 776 or, as shown, receiver 778 may be provided in a mounting boss

780. Mounting boss 780 extends outward from upper portion 725 of first frame member 711 into recess 776, and provides a locating surface for a spring 782 that biases end 772 of adjustment member 752 away from first frame member 711. Spring 782 may be any suitable biasing member including but not limited to a fluid filled bladder or cylinder, a leaf spring, or a coil spring, as shown. Boss 780 is configured to receive spring 782 thereon. For example, boss 780 has a cylindrical outer surface sized to fit within the bore of coil spring shown. A notched recess 783 may be formed in adjustment member 752 to capture the end of the spring 782.

Screw 770 may be driven inward against the force of spring 782 to angle second end 773 of adjustment member 752 outward. Releasing the force of screw 770 allows spring 782 to bias second end 773 inward toward frame 25. Wire guide 90 is mounted on second end 773 of adjustment member 752. A cylindrical boss 798 extends inward from first holder 702 and is received in a guide bore 800 formed in the end 773 of adjustment member 752. A cap screw 802 may thread into boss 798 on the opposite side of adjustment member 752. Wire guide holder 702 may rotate within side bore 800 to adjust the position of wire guide 90 (FIG. 27), and the position may be locked by a fastener, such as, a socket head cap screw or set screw 804 (FIG. 25). In the example shown, the guide bore 800 defines a horizontal axis of rotation and provides for rotation of the wire guide 90 in addition to the adjustment provided by the fixture frame 710.

As shown in FIG. 29-32, to provide a larger range of motion for wire guide 90, a second holder 810 may be used in combination with first holder 702. Second holder 810 has a boss 812 that is received in the guide bore 701 of first holder 702 and held with set screw 703. Second holder 810 defines a second guide bore 814 in which the wire guide 90 is received. As shown, second guide bore 814 may be oriented at an angle relative to the first guide bore 701 to provide a steeper angle for the wire guide 90. In the example shown, second guide bore 814 is oriented perpendicular to second boss 812 such that when second boss 812 is received in first guide bore 701, the second guide bore 814 is oriented perpendicular to first guide bore 701. A second set screw 815 is received in the boss shaft 812 and extends into second bore 814 to hold wire guide 90 within second bore 814. FIGS. 31 and 32 depict the second holder 810 in an alternative configuration, where the second holder 810 is rotated to a position above the adjustment member 752 to create a steeper angle for the wire guide 90. Such a configuration may be useful in deep groove welding.

With reference to FIGS. 33 and 34, an alternative second holder generally indicated by the number 825 is shown. Second holder 825 includes an elongated shaft 826 in place of the boss used in the previous embodiment. The elongated shaft may be made hollow defining an axially extending threaded bore 828 adapted to receive a set screw 830 therein. The threaded bore 828 communicates with the wire guide bore 829 formed in the holder 825 allowing the set screw 830 in the shaft 826 to lock the wire guide 90 within the holder 825. This may be accomplished by allowing a portion of set screw 830 to extend into second guide bore 829 and contact wire guide 90 therein, as shown. Bore 828 in shaft 826 is open at an outward end 833 to allow a tool to be inserted within the bore 828 to adjust set screw 830. Set screw 830 has a tool receiver 831 at its axial outward end, such as an Allen, Phillips, Torx™ or Standard head, to receive an end of the tool. As in the previous embodiments, second holder 825 may be supported by first holder 702 by inserting the elongated shaft 826 within bore 701 and securing it in place with the set screw 703. Providing a set screw 830 within the shaft 826 may be incorporated in other embodiments by providing a thread bore in the bosses described above. This arrangement is believed to have advantages when the confines of the welding area make it difficult to access the set screw 703 which is located normal to the frame 25.

Overall, operation of welding system 10 may include positioning a workpiece WP within opening 35 and powering the system 10 so that torch head 20 is moved laterally and vertically to align electrode E with the joint between the parts of the work piece that are to be welded. The system controller 120 may be programmed to apply a weld to the joint as relative rotation occurs between the workpiece WP and the electrode. This may include laterally moving the torch head 20 on guide assembly 260 by operation of actuator assembly 230. Adjustments to the height and lateral position of the electrode may be made automatically through feedback from the torch head 20 and other sensors and/or by manual adjustments made by the operator. For example, voltage feedback from torch head 20 may be used by system controller 120 to drive torch height motor 112 to raise/lower the welding head by moving mounting bracket relative to frame 25. Similar feedback may be used to adjust wire feed speed, the speed of rotation between the torch head and workpiece WP, lateral torch head speed and stroke length, and other welding system parameters. System controller 120 may also accept manual input to adjust these parameters. For example, the operator may "steer" the torch head 20 by making manual adjustments during oscillation (lateral movement) of torch head 20. Effectively, system controller 120 sees the joint as the center of oscillation, and the manual input from the user may be used to reset this center point effectively steering the oscillation left or right of the original center point value.

In addition, manual adjustment of the wire position may be made during set up of the torch head 20 using wire fixture assembly 400 or alternative wire fixture assembly 700, as discussed above. Wire fixture assemblies 400 and 700 are housed within body 270 of torch head 20 to maximize radial clearance for the workpiece WP. The body 270 of torch head 20 may have a wedge-like shape tapering upward and inward from the side 276 of body 270 that houses wire fixture assembly 400 and torch head cooling assembly 300 to define a recessed area 280 in which the electrode assembly 350 and shielding cup 285 are received to further maximize radial clearance for the workpiece WP.

Operation of welding system 10 creates heat at torch head 20 and through operation of the motors 112, 140 used to position torch head 20. Welding system 10 may supply coolant via a motor housing cooling assembly 175 and torch head cooling assembly 300. These assemblies may be controlled by system controller 120, manually activated, or run continuously when the system 10 is powered.

While principles and modes of operation have been explained and illustrated with regard to particular embodiments, it must be understood that this may be practiced otherwise than as specifically explained and illustrated without departing from its spirit or scope.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

Specific embodiments of an innovation are disclosed herein. One of ordinary skill in the art will readily recognize that the innovation may have other applications in other environments. In fact, many embodiments and implementations are possible. The following claims are in no way intended to limit the scope of the subject innovation to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means".

Although the subject innovation has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (e.g., enclosures, sides, components, assemblies, etc.), the terms (including a reference to a "means") used to describe such elements are intended to correspond, unless otherwise indicated, to any element which performs the specified function of the described element (e.g., that is functionally equivalent), even though not structurally equivalent to the disclosed structure which performs the function in the herein illustrated exemplary embodiment or embodiments of the innovation. In addition, while a particular feature of the innovation may have been described above with respect to only one or more of several illustrated embodiments, such feature may be combined with one or more other features of the other embodiments, as may be desired and advantageous for any given or particular application. Although certain embodiments have been shown and described, it is understood that equivalents and modifications falling within the scope of the appended claims will occur to others who are skilled in the art upon the reading and understanding of this specification.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A welding system for applying a weld to a workpiece, the welding system comprising:
    a frame;
    a welding torch mounted on the frame, the welding torch including an electrode;
    a wire guide having a passage through which a wire is configured to be conveyed toward the electrode;
    a wire alignment assembly including a fixture frame having a wire guide holder mounted thereon, the wire guide being supported on the wire guide holder, wherein the fixture frame provides multiple degrees of freedom for adjusting the position of the wire guide;
    the fixture frame being pivotally mounted on the frame to allow vertical adjustment of the wire guide and fixable in a selected rotational position relative to the frame;
    wherein the fixture frame further includes an adjustment member pivotable about a vertical axis to move the wire guide about a first degree of freedom and supported on the fixture frame, wherein the adjustment member is fixable in a selected position about the vertical axis;
    wherein the wire guide holder is supported on the adjustment member and wherein the wire guide holder is rotatable about a horizontal axis to move the wire guide about a second degree of freedom different from the first degree of freedom, and wherein the wire guide holder is selectively fixable in a selected position about the horizontal axis independently of the fixture frame.

2. The welding system of claim 1, wherein the wire alignment assembly includes a vertical slot formed in the frame, an adjustment bore located below the pivot axis of the fixture frame, a shaft rotatably mounted in the adjustment bore, the shaft having a pin spaced from a center axis of the shaft and received within the slot, wherein rotation of the shaft causes rotation of the fixture frame, and wherein the lock assembly engages the shaft to fix the fixture frame in the selected position.

3. The welding system of claim 1 further comprising a lock assembly to fix the fixture frame in a selected rotational position relative to the frame, wherein the lock assembly includes a height locking fastener.

4. The welding system of claim 1, wherein the fixture frame includes an outwardly projecting tongue defining a vertical bore, the adjustment member defining a slot adapted to receive the tongue therein, at least one wall of the slot defining a bore aligned with the vertical bore in the tongue, a pin extending through the vertical bore of the tongue and into the bore defined in the at least one wall to pivotally attach the adjustment member to the fixture frame.

5. The welding system of claim 4, wherein the fixture frame defines a recess adjacent to the tongue and a first end of the adjustment member, wherein the alignment screw extends through the first end of the adjustment member at the recess, a boss extending outward from the fixture frame within the recess and defining a threaded receiver in which the alignment screw is received.

6. The welding system of claim 5, wherein a spring is supported between the fixture frame and the adjustment member to bias the adjustment member outward relative to the fixture frame.

7. The welding system of claim 6, wherein the spring is mounted on the boss.

8. The welding system of claim 7, wherein the boss has a cylindrical outer surface and the spring is a coil spring adapted to fit over the boss.

9. The welding system of claim 1 further comprising a second holder having an elongated shaft, the elongated shaft being received within a bore formed in the wire guide holder, the wire guide being received in a second bore in the second holder.

10. The welding system of claim 1 further comprising an alignment screw adapted to fix the position of the adjustment member.

11. A welding system for applying a weld to a workpiece, the welding system comprising:
    a frame;
    a welding torch mounted on the frame, the welding torch including an electrode;

a wire guide having a passage through which a wire is configured to be conveyed toward the electrode;

a wire alignment assembly including a fixture frame having a wire guide holder mounted thereon, the wire guide being supported on the wire guide holder, wherein the fixture frame provides multiple degrees of freedom for adjusting the position of the wire guide;

the fixture frame including an adjustment member, wherein the wire guide holder is supported on the adjustment member and pivotable about a horizontal axis to selectively position the wire guide relative to the horizontal axis and move the wire guide about a first degree of freedom;

wherein the fixture frame includes an outwardly projecting tongue the adjustment member being pivotally attached to the tongue to rotate about a vertical axis to selectively position the wire guide relative to the vertical axis to move the wire guide about a second degree of freedom different from the first degree of freedom.

12. The welding system of claim 11, wherein the adjustment member defines a slot that at least partially receives the tongue therein, wherein the adjustment member is pivotally attached to the tongue by a pin extending through the tongue and into at least one corresponding bore defined in the adjustment member.

13. The welding system of claim 11 further comprising a biasing member located between the fixture frame and the adjustment member to bias the adjustment member away from the fixture frame.

14. The welding system of claim 13 further comprising a screw extending through the adjustment member and threaded into the fixture frame to apply a force to the adjustment member acting opposite to the force of the biasing member.

15. The welding system of claim 11, wherein the fixture frame defines a recess adjacent to the tongue and a first end of the adjustment member; a boss extending outward from the fixture frame within the recess and defining a threaded receiver, wherein an alignment screw extends through the first end of the adjustment member at the recess and is received within the threaded receiver; wherein a spring is supported on the boss and extends between the fixture frame and the adjustment member to bias the adjustment member outward relative to the fixture frame.

16. The welding system of claim 11, wherein the adjustment member defines a cylindrical bore and the wire guide holder includes a cylindrical boss that extends into the cylindrical bore to rotatably mount the wire guide holder to the adjustment member, wherein the wire guide holder is fixable in a selected rotational position within the cylindrical bore.

17. The welding system of claim 16 further comprising a second holder having a second boss extending outward therefrom, wherein the wire guide holder defines a guide bore and wherein the second boss is received within the holder bore; the second holder defining a second guide bore oriented at an angle relative to the guide bore, wherein the wire guide is received in the second guide bore.

18. The welding system of claim 17, wherein the second guide bore 1 s oriented at a perpendicular angle relative to the guide bore.

19. The welding system of claim 17, wherein the second boss includes a shaft having a length greater than the guide bore, wherein the shaft is slideable within the guide bore and fixable at a selected position relative to the guide bore.

20. The welding system of claim 19, wherein the shaft of the second boss defines a threaded bore opening at an outward end of the shaft, the threaded bore receiving a set screw to fix the position of the second holder relative to the guide bore.

* * * * *